US011040650B2

(12) United States Patent
Kim

(10) Patent No.: US 11,040,650 B2
(45) Date of Patent: Jun. 22, 2021

(54) METHOD FOR CONTROLLING VEHICLE IN AUTONOMOUS DRIVING SYSTEM AND APPARATUS THEREOF

(71) Applicant: LG Electronics Inc., Seoul (KR)

(72) Inventor: Soryoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 7 days.

(21) Appl. No.: 16/558,023

(22) Filed: Aug. 30, 2019

(65) Prior Publication Data
US 2020/0001774 A1 Jan. 2, 2020

(30) Foreign Application Priority Data
Jul. 31, 2019 (KR) .................. 10-2019-0093118

(51) Int. Cl.
B60Q 1/08 (2006.01)
G06K 9/00 (2006.01)
(Continued)

(52) U.S. Cl.
CPC .......... B60Q 1/085 (2013.01); G05D 1/0088 (2013.01); G06K 9/00791 (2013.01); G06T 7/70 (2017.01); G07C 5/008 (2013.01); H04W 4/40 (2018.02); G05D 2201/0213 (2013.01); G06T 2207/30252 (2013.01)

(58) Field of Classification Search
None
See application file for complete search history.

(56) References Cited

U.S. PATENT DOCUMENTS 7,561,064 B2 * 7/2009 Yamamoto ........... B60Q 1/1423
340/425.5
8,854,471 B2 * 10/2014 Kang ..................... G01S 17/02
348/164
(Continued)

FOREIGN PATENT DOCUMENTS

JP 2009149190 7/2009
JP 2018136211 8/2018
(Continued)

OTHER PUBLICATIONS

Korean Office Action in Korean Appln. No. 10-2019-0093118, dated May 22, 2020, 10 pages (with English translation).
(Continued)

Primary Examiner — Chico A Foxx
(74) Attorney, Agent, or Firm — Fish & Richardson P.C.

(57) ABSTRACT

A method and apparatus for controlling a vehicle in an autonomous driving system. The method for controlling a vehicle in an autonomous driving system can improve recognition accuracy of an object by outputting light corresponding to a first brightness value changed in correspondence to detection of an object having a recognition error larger than a predetermined range during driving while outputting light corresponding to a first brightness value that is determined of the basis of information about external illumination. An autonomous vehicle of the present disclosure may be associated with an artificial intelligence module, a drone ((Unmanned Aerial Vehicle, UAV), a robot, an AR (Augmented Reality) device, a VR (Virtual Reality) device, a device associated with 5G services, etc.

20 Claims, 26 Drawing Sheets

(51) Int. Cl.
*G06T 7/70* (2017.01)
*G05D 1/00* (2006.01)
*G07C 5/00* (2006.01)
*H04W 4/40* (2018.01)

(56) References Cited

U.S. PATENT DOCUMENTS

| | | | |
|---|---|---|---|
| 9,313,862 B1* | 4/2016 | Helton | G08G 1/163 |
| 9,493,108 B2* | 11/2016 | Morishita | B60Q 1/076 |
| 10,183,614 B1* | 1/2019 | Biswal | B60Q 1/143 |
| 10,427,590 B2* | 10/2019 | Jeon | B60Q 1/085 |
| 2003/0028291 A1* | 2/2003 | Matsuura | G01S 17/42 |
| | | | 701/1 |
| 2004/0143380 A1* | 7/2004 | Stam | B60Q 1/085 |
| | | | 701/36 |
| 2004/0201483 A1* | 10/2004 | Stam | G06K 9/00798 |
| | | | 340/600 |
| 2005/0134483 A1* | 6/2005 | Monji | B60Q 1/085 |
| | | | 340/933 |
| 2008/0231195 A1* | 9/2008 | Kobayashi | B60Q 1/085 |
| | | | 315/82 |
| 2010/0091513 A1* | 4/2010 | Kamioka | B60Q 1/1423 |
| | | | 362/523 |
| 2010/0231513 A1* | 9/2010 | Deliwala | G01S 3/783 |
| | | | 345/158 |
| 2012/0081542 A1* | 4/2012 | Suk | G06K 9/00805 |
| | | | 348/139 |
| 2012/0275172 A1* | 11/2012 | Mizuno | B60Q 1/085 |
| | | | 362/464 |
| 2013/0049588 A1* | 2/2013 | Foltin | B60Q 1/115 |
| | | | 315/82 |
| 2013/0058592 A1* | 3/2013 | Schwarzenberg | G06K 9/00825 |
| | | | 382/274 |
| 2013/0116857 A1* | 5/2013 | Mitsugi | G06T 7/90 |
| | | | 701/1 |
| 2013/0131922 A1* | 5/2013 | Ogata | G08G 1/165 |
| | | | 701/36 |
| 2013/0158960 A1* | 6/2013 | Rentschler | B60Q 1/10 |
| | | | 703/2 |
| 2014/0029008 A1* | 1/2014 | Hirai | G01N 21/552 |
| | | | 356/445 |
| 2014/0146175 A1* | 5/2014 | Jeon | B60Q 1/1423 |
| | | | 348/148 |
| 2014/0169010 A1* | 6/2014 | Imaeda | B60Q 1/02 |
| | | | 362/460 |
| 2014/0226349 A1* | 8/2014 | Morishita | B60R 1/00 |
| | | | 362/466 |
| 2014/0333201 A1* | 11/2014 | Foltin | B60Q 1/143 |
| | | | 315/82 |
| 2015/0003087 A1* | 1/2015 | Futamura | B60Q 9/008 |
| | | | 362/466 |
| 2015/0219300 A1* | 8/2015 | Kishi | F21S 41/20 |
| | | | 362/510 |
| 2017/0270375 A1* | 9/2017 | Grauer | G06K 9/6293 |
| 2017/0305328 A1* | 10/2017 | Kato | B60Q 1/143 |
| 2018/0205892 A1* | 7/2018 | Kamimura | G06K 19/06037 |
| 2019/0104204 A1* | 4/2019 | Kawakami | H04L 1/205 |
| 2019/0359118 A1* | 11/2019 | Spenner | B60Q 1/076 |
| 2019/0384060 A1* | 12/2019 | Naruse | H04N 5/2351 |
| 2020/0020114 A1* | 1/2020 | Guerrero | G06K 9/3241 |
| 2020/0041614 A1* | 2/2020 | Donovan | G01S 17/87 |
| 2020/0114805 A1* | 4/2020 | Ridler | B60Q 1/085 |
| 2020/0164814 A1* | 5/2020 | Solar | H04N 7/183 |
| 2020/0309898 A1* | 10/2020 | Boutaud | G01S 7/023 |

FOREIGN PATENT DOCUMENTS

| | | | | |
|---|---|---|---|---|
| KR | 1020130063566 | | 6/2013 | |
| KR | 20160112679 A | * | 9/2016 | |
| KR | 1020160112679 | | 9/2016 | |
| KR | 20190046619 A | * | 5/2019 | ........ G06K 9/6262 |
| KR | 1020190046619 | | 5/2019 | |
| WO | WO-2018155018 A1 | * | 8/2018 | ........ G06K 9/00791 |

OTHER PUBLICATIONS

KR Notice of Allowance in Korean Appln. No. 10-2019-0093118, dated Nov. 23, 2020, 6 pages (with English translation).

* cited by examiner

FIG. 5
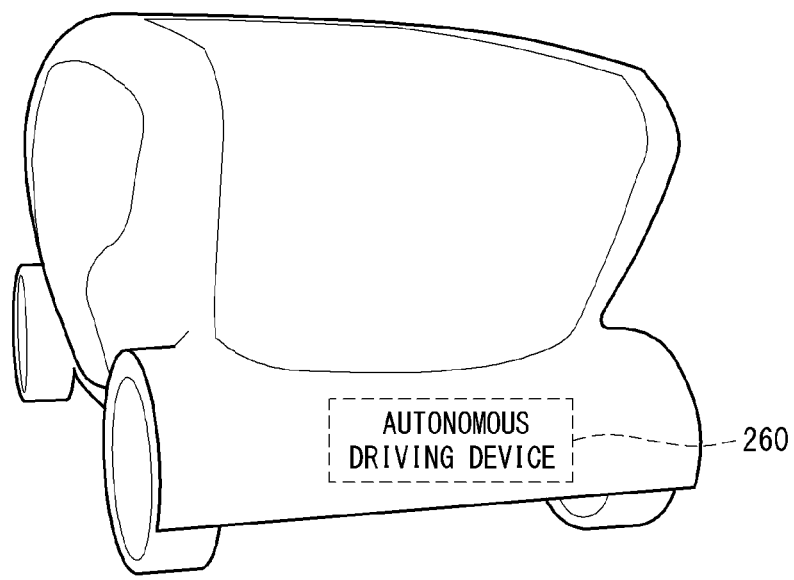
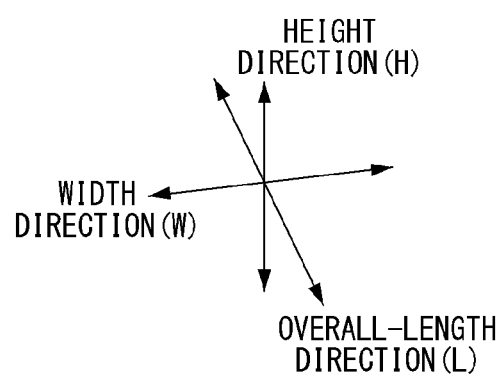

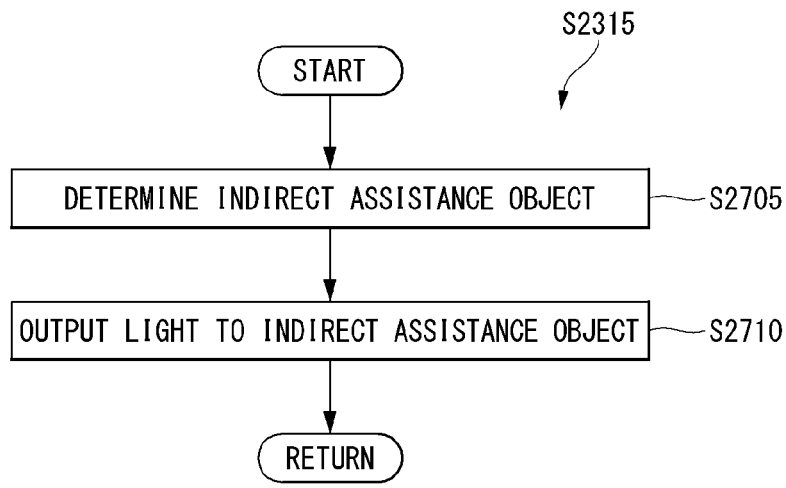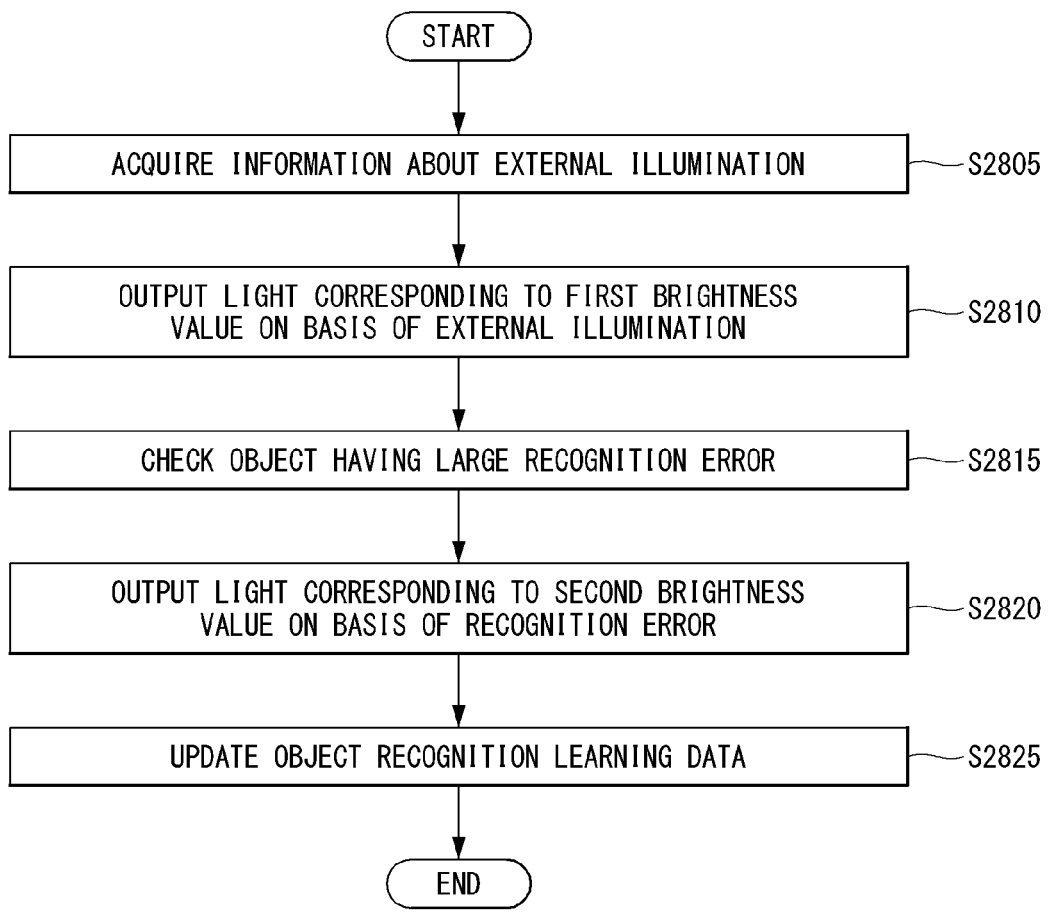

METHOD FOR CONTROLLING VEHICLE IN AUTONOMOUS DRIVING SYSTEM AND APPARATUS THEREOF

CROSS-REFERENCE TO RELATED APPLICATION

This application claims the benefit of Korean Patent Application No. 10-2019-0093118 filed on Jul. 31, 2019, the entire contents of which is incorporated herein by reference for all purposes as if fully set forth herein.

BACKGROUND

Field of the Disclosure

The present disclosure relates to a method for controlling a vehicle in an autonomous driving system and an apparatus thereof and, more particularly, to a method and apparatus for controlling a vehicle to accurately recognize an object in an autonomous driving system.

Description of the Background

Vehicles, in accordance with the prime mover that is used, can be classified into an internal combustion engine vehicle, an external combustion engine vehicle, a gas turbine vehicle, an electric vehicle or the like.

An autonomous vehicle refers to a vehicle that can be driven by itself without operation by a driver or a passenger and an autonomous driving system refers to a system that monitors and controls such an autonomous vehicle so that the autonomous vehicle can be driven by itself.

In an autonomous driving system, a vehicle performs learning to improve object recognition accuracy in various environments. It is required in a learning process of a vehicle to accurately recognize an object such as a pedestrian or an obstacle.

SUMMARY

An object of the present disclosure is to solve the necessities and/or problems described above.

Further, an object of the present disclosure is to implement a method and apparatus for controlling a vehicle to accurately recognize an object in an autonomous driving system.

Further, an object of the present disclosure is to implement a method and apparatus for controlling a vehicle to accurately recognize an object in an autonomous driving system.

A method for controlling a vehicle in an autonomous driving system according to an embodiment of the present disclosure includes: acquiring an information about external illumination outside a vehicle; outputting light corresponding to a first brightness value that is determined on the basis of information about external illumination; checking an object having a recognition error larger than a predetermined range while outputting the light corresponding to the first brightness value; and outputting light corresponding to a second brightness value that is determined on the basis of a recognition error of the object.

The method may further include updating learning data for the object having a recognition error larger than the predetermined range. The updating of learning data may include: checking whether the recognition error of the object decreases by outputting light corresponding to the second brightness; transmitting recognition information about the object to a server when the recognition error decreases, the recognition information about the object including at least one of information about the object, information about the decreased recognition error of the object, or information about second brightness output by the vehicle; and transmitting image data including the object to the server and receiving recognition processing result information about the object from the server when the recognition error has not decreased.

An apparatus for controlling a vehicle in an autonomous driving system according to another embodiment of the present disclosure includes: a processor that controls functions of the vehicle; a camera that is combined with the processor and generates image data of a surrounding of the vehicle; headlights that are combined with the processor and outputs light to the surrounding vehicle; a memory that is combined with the memory and stores data for controlling the vehicle; and a transceiver that is combined with the processor and transmits or receives the data for controlling the vehicle, in which the processor is configured to acquire information about external illumination of the vehicle through the camera, control the headlights to output light corresponding to a first brightness value that is determined on the basis of the external illumination, check an object having a recognition error larger than a predetermined range while outputting light corresponding to the first brightness value, and control the headlights to output light corresponding to a second brightness value on the basis of a recognition error of the object.

BRIEF DESCRIPTION OF THE DRAWINGS

Accompanying drawings included as a part of the detailed description for helping understand the present disclosure provide embodiments of the present disclosure and are provided to describe technical features of the present disclosure with the detailed description.

FIG. 5 is a block diagram of an AI device according to an embodiment of the present disclosure.

FIG. 27 is a flowchart showing an example of a process of performing surrounding object-indirect assistance in an autonomous driving system according to an embodiment of the present disclosure.

FIG. 28 is a flowchart showing another example of a method for controlling a vehicle in an autonomous driving system according to an embodiment of the present disclosure.

Accompanying drawings included as a part of the detailed description for helping understand the present disclosure provide embodiments of the present disclosure and are provided to describe technical features of the present disclosure with the detailed description.

DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereafter, a device that requires autonomous driving information and/or 5G communication (5th generation mobile communication) that an autonomous vehicle requires are described through a paragraph A to a paragraph G.

A. Example of Block Diagram of UE and 5G Network

Figure 1:
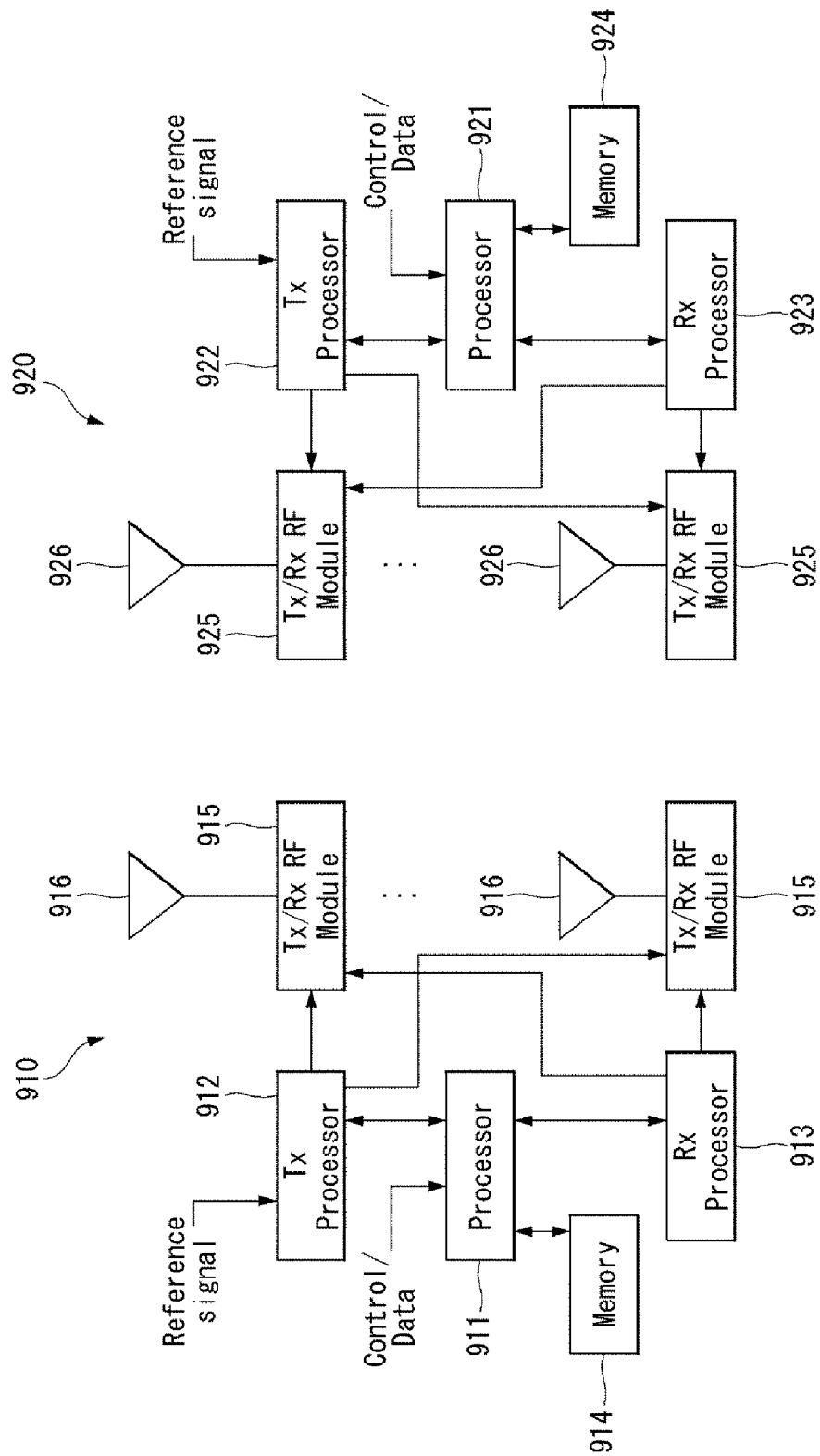
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, a terminal or user equipment (UE) may include a vehicle, a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
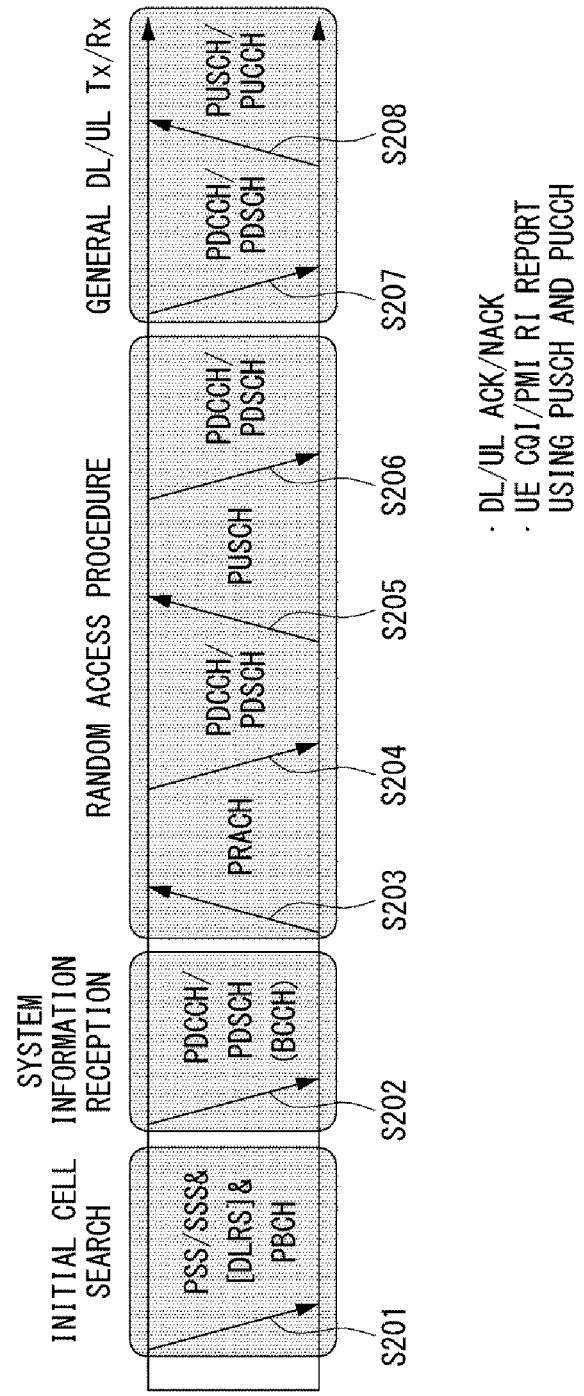
FIG. 2 is a diagram showing an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

Figure 3:
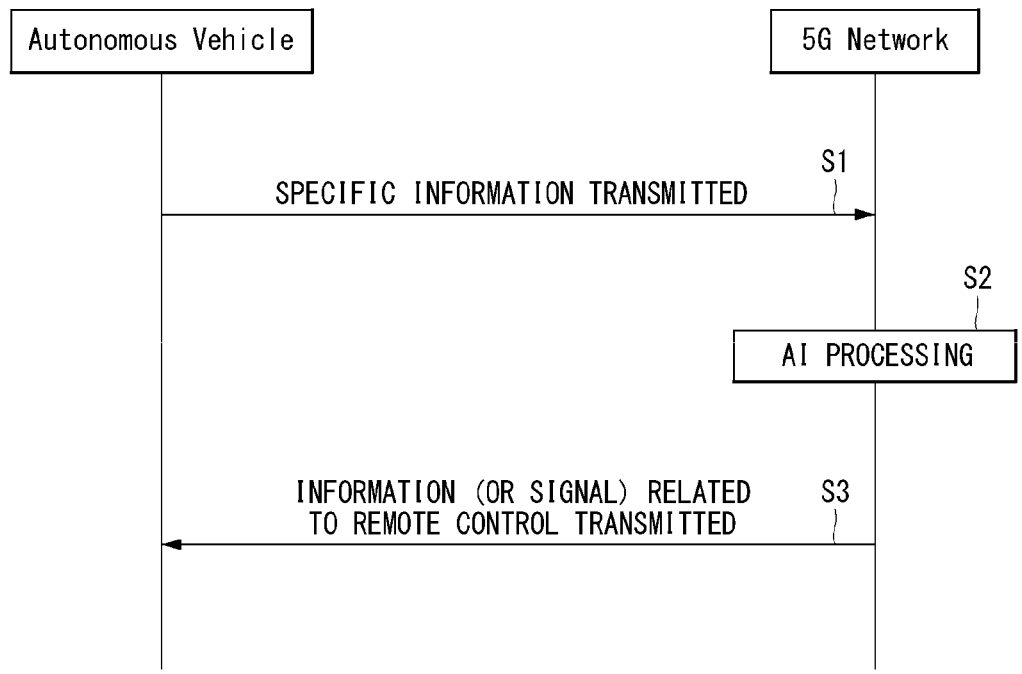
FIG. 3 shows an example of basic operations of a user equipment and a 5G network in a 5G communication system.

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present disclosure which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

H. Autonomous Driving Operation Between Vehicles Using 5G Communication

Figure 4:
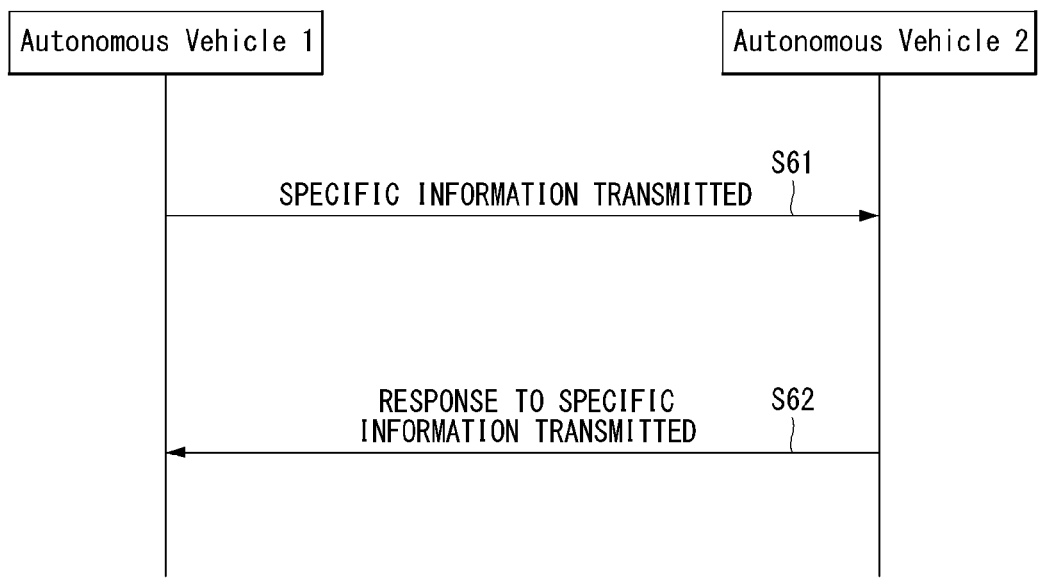
FIG. 4 is a diagram showing a vehicle according to an embodiment of the present disclosure.

FIG. 4 shows an example of a basic operation between vehicles using 5G communication.

A first vehicle transmits specific information to a second vehicle (S61). The second vehicle transmits a response to the specific information to the first vehicle (S62).

Meanwhile, a configuration of an applied operation between vehicles may depend on whether the 5G network is directly (sidelink communication transmission mode 3) or indirectly (sidelink communication transmission mode 4) involved in resource allocation for the specific information and the response to the specific information.

Next, an applied operation between vehicles using 5G communication will be described.

First, a method in which a 5G network is directly involved in resource allocation for signal transmission/reception between vehicles will be described.

The 5G network can transmit DCI format 5A to the first vehicle for scheduling of mode-3 transmission (PSCCH and/or PSSCH transmission). Here, a physical sidelink control channel (PSCCH) is a 5G physical channel for scheduling of transmission of specific information a physical sidelink shared channel (PSSCH) is a 5G physical channel for transmission of specific information. In addition, the first vehicle transmits SCI format 1 for scheduling of specific information transmission to the second vehicle over a PSCCH. Then, the first vehicle transmits the specific information to the second vehicle over a PSSCH.

Next, a method in which a 5G network is indirectly involved in resource allocation for signal transmission/reception will be described.

The first vehicle senses resources for mode-4 transmission in a first window. Then, the first vehicle selects resources for mode-4 transmission in a second window on the basis of the sensing result. Here, the first window refers to a sensing window and the second window refers to a selection window. The first vehicle transmits SCI format 1 for scheduling of transmission of specific information to the second vehicle over a PSCCH on the basis of the selected resources. Then, the first vehicle transmits the specific information to the second vehicle over a PSSCH.

The above-described 5G communication technology can be combined with methods proposed in the present disclosure which will be described later and applied or can complement the methods proposed in the present disclosure to make technical features of the methods concrete and clear.

Driving (1) Exterior of Vehicle

FIG. 5 is a diagram showing a vehicle according to an embodiment of the present disclosure.

Referring to FIG. 5, a vehicle 10 according to an embodiment of the present disclosure is defined as a transportation means traveling on roads or railroads. The vehicle 10 includes a car, a train and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle. The vehicle 10 may be a shared vehicle. The vehicle 10 may be an autonomous vehicle.

(2) Components of Vehicle

Figure 6:
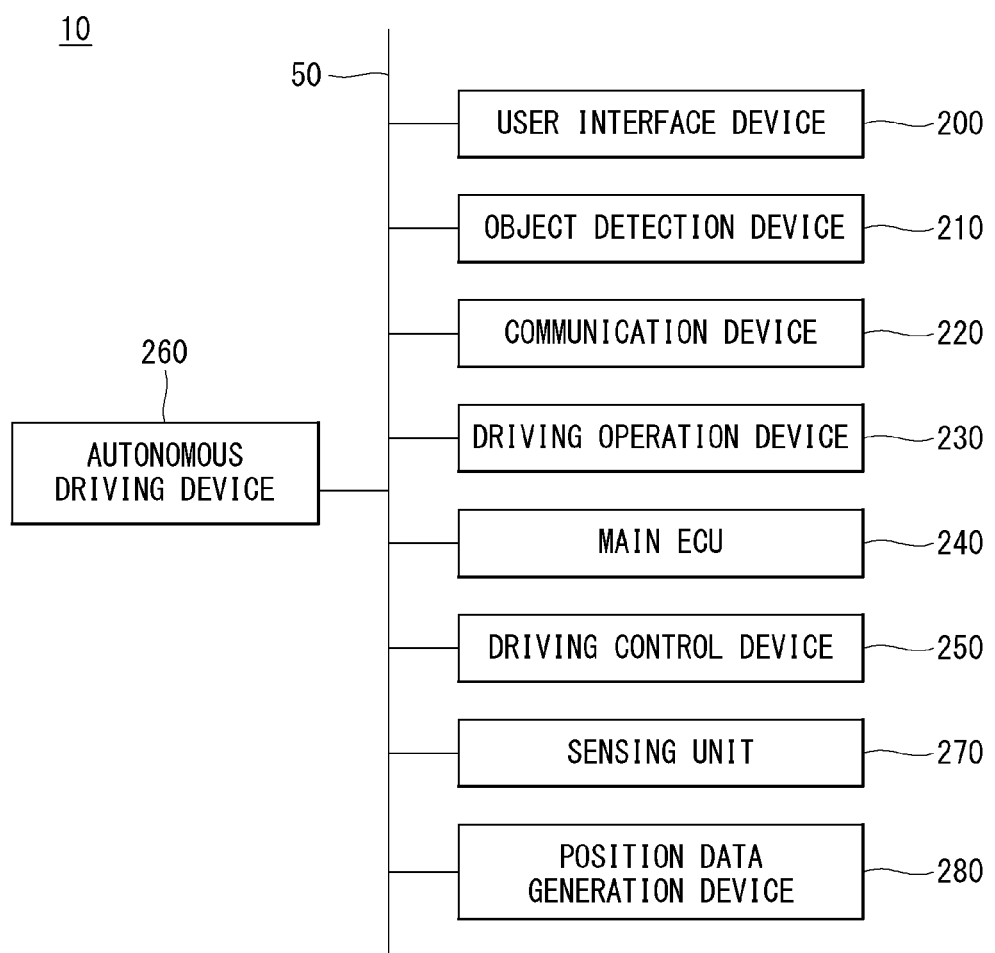
FIG. 6 is a diagram for illustrating a system in which an autonomous vehicle and an AI device according to an embodiment of the present disclosure are linked.

FIG. 6 is a control block diagram of the vehicle according to an embodiment of the present disclosure.

Referring to FIG. 6, the vehicle 10 may include a user interface device 200, an object detection device 210, a communication device 220, a driving operation device 230, a main ECU 240, a driving control device 250, an autonomous driving device 260, a sensing unit 270, and a position data generation device 280. The object detection device 210, the communication device 220, the driving operation device 230, the main ECU 240, the driving control device 250, the autonomous driving device 260, the sensing unit 270 and the position data generation device 280 may be realized by electronic devices which generate electric signals and exchange the electric signals from one another.

1) User Interface Device

The user interface device 200 is a device for communication between the vehicle 10 and a user. The user interface device 200 can receive user input and provide information generated in the vehicle 10 to the user. The vehicle 10 can realize a user interface (UI) or user experience (UX) through the user interface device 200. The user interface device 200 may include an input device, an output device and a user monitoring device.

2) Object Detection Device

The object detection device 210 can generate information about objects outside the vehicle 10. Information about an object can include at least one of information on presence or absence of the object, positional information of the object, information on a distance between the vehicle 10 and the object, and information on a relative speed of the vehicle 10 with respect to the object. The object detection device 210 can detect objects outside the vehicle 10. The object detection device 210 may include at least one sensor which can detect objects outside the vehicle 10. The object detection device 210 may include at least one of a camera, a radar, a lidar, an ultrasonic sensor and an infrared sensor. The object detection device 210 can provide data about an object generated on the basis of a sensing signal generated from a sensor to at least one electronic device included in the vehicle.

2.1) Camera

The camera can generate information about objects outside the vehicle 10 using images. The camera may include at least one lens, at least one image sensor, and at least one processor which is electrically connected to the image sensor, processes received signals and generates data about objects on the basis of the processed signals.

The camera may be at least one of a mono camera, a stereo camera and an around view monitoring (AVM) camera. The camera can acquire positional information of objects, information on distances to objects, or information on relative speeds with respect to objects using various image processing algorithms. For example, the camera can acquire information on a distance to an object and information on a relative speed with respect to the object from an acquired image on the basis of change in the size of the object over time. For example, the camera may acquire information on a distance to an object and information on a relative speed with respect to the object through a pin-hole model, road profiling, or the like. For example, the camera may acquire information on a distance to an object and information on a relative speed with respect to the object from a stereo image acquired from a stereo camera on the basis of disparity information.

The camera may be attached at a portion of the vehicle at which FOV (field of view) can be secured in order to photograph the outside of the vehicle. The camera may be disposed in proximity to the front windshield inside the vehicle in order to acquire front view images of the vehicle. The camera may be disposed near a front bumper or a radiator grill. The camera may be disposed in proximity to a rear glass inside the vehicle in order to acquire rear view images of the vehicle. The camera may be disposed near a rear bumper, a trunk or a tail gate. The camera may be disposed in proximity to at least one of side windows inside the vehicle in order to acquire side view images of the vehicle. Alternatively, the camera may be disposed near a side mirror, a fender or a door.

2.2) Radar

The radar can generate information about an object outside the vehicle using electromagnetic waves. The radar may include an electromagnetic wave transmitter, an electromagnetic wave receiver, and at least one processor which is electrically connected to the electromagnetic wave transmitter and the electromagnetic wave receiver, processes received signals and generates data about an object on the basis of the processed signals. The radar may be realized as a pulse radar or a continuous wave radar in terms of electromagnetic wave emission. The continuous wave radar may be realized as a frequency modulated continuous wave (FMCW) radar or a frequency shift keying (FSK) radar according to signal waveform. The radar can detect an object through electromagnetic waves on the basis of TOF (Time of Flight) or phase shift and detect the position of the detected object, a distance to the detected object and a relative speed with respect to the detected object. The radar may be disposed at an appropriate position outside the vehicle in order to detect objects positioned in front of, behind or on the side of the vehicle.

2.3) Lidar

The lidar can generate information about an object outside the vehicle 10 using a laser beam. The lidar may include a light transmitter, a light receiver, and at least one processor which is electrically connected to the light transmitter and the light receiver, processes received signals and generates data about an object on the basis of the processed signal. The lidar may be realized according to TOF or phase shift. The lidar may be realized as a driven type or a non-driven type.

A driven type lidar may be rotated by a motor and detect an object around the vehicle 10. A non-driven type lidar may detect an object positioned within a predetermined range from the vehicle according to light steering. The vehicle 10 may include a plurality of non-drive type lidars. The lidar can detect an object through a laser beam on the basis of TOF (Time of Flight) or phase shift and detect the position of the detected object, a distance to the detected object and a relative speed with respect to the detected object. The lidar may be disposed at an appropriate position outside the vehicle in order to detect objects positioned in front of, behind or on the side of the vehicle.

3) Communication Device

The communication device 220 can exchange signals with devices disposed outside the vehicle 10. The communication device 220 can exchange signals with at least one of infrastructure (e.g., a server and a broadcast station), another vehicle and a terminal. The communication device 220 may include a transmission antenna, a reception antenna, and at least one of a radio frequency (RF) circuit and an RF element which can implement various communication protocols in order to perform communication.

For example, the communication device can exchange signals with external devices on the basis of C-V2X (Cellular V2X). For example, C-V2X can include sidelink communication based on LTE and/or sidelink communication based on NR. Details related to C-V2X will be described later.

For example, the communication device can exchange signals with external devices on the basis of DSRC (Dedicated Short Range Communications) or WAVE (Wireless Access in Vehicular Environment) standards based on IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards).

The communication device of the present disclosure can exchange signals with external devices using only one of C-V2X and DSRC. Alternatively, the communication device of the present disclosure can exchange signals with external devices using a hybrid of C-V2X and DSRC.

4) Driving Operation Device

The driving operation device 230 is a device for receiving user input for driving. In a manual mode, the vehicle 10 may be driven on the basis of a signal provided by the driving operation device 230. The driving operation device 230 may include a steering input device (e.g., a steering wheel), an acceleration input device (e.g., an acceleration pedal) and a brake input device (e.g., a brake pedal).

5 Main ECU

The main ECU 240 can control the overall operation of at least one electronic device included in the vehicle 10.

6) Driving Control Device

The driving control device 250 is a device for electrically controlling various vehicle driving devices included in the vehicle 10. The driving control device 250 may include a power train driving control device, a chassis driving control device, a door/window driving control device, a safety device driving control device, a lamp driving control device, and an air-conditioner driving control device. The power train driving control device may include a power source driving control device and a transmission driving control device. The chassis driving control device may include a steering driving control device, a brake driving control device and a suspension driving control device. Meanwhile, the safety device driving control device may include a seat belt driving control device for seat belt control.

The driving control device 250 includes at least one electronic control device (e.g., a control ECU (Electronic Control Unit)).

The driving control device 250 can control vehicle driving devices on the basis of signals received by the autonomous driving device 260. For example, the driving control device 250 can control a power train, a steering device and a brake device on the basis of signals received by the autonomous driving device 260.

7) Autonomous Device

The autonomous driving device 260 can generate a route for self-driving on the basis of acquired data. The autonomous driving device 260 can generate a driving plan for traveling along the generated route. The autonomous driving device 260 can generate a signal for controlling movement of the vehicle according to the driving plan. The autonomous driving device 260 can provide the signal to the driving control device 250.

The autonomous driving device 260 can implement at least one ADAS (Advanced Driver Assistance System) function. The ADAS can implement at least one of ACC (Adaptive Cruise Control), AEB (Autonomous Emergency Braking), FCW (Forward Collision Warning), LKA (Lane Keeping Assist), LCA (Lane Change Assist), TFA (Target Following Assist), BSD (Blind Spot Detection), HBA (High Beam Assist), APS (Auto Parking System), a PD collision warning system, TSR (Traffic Sign Recognition), TSA (Traffic Sign Assist), NV (Night Vision), DSM (Driver Status Monitoring) and TJA (Traffic Jam Assist).

The autonomous driving device 260 can perform switching from a self-driving mode to a manual driving mode or switching from the manual driving mode to the self-driving mode. For example, the autonomous driving device 260 can switch the mode of the vehicle 10 from the self-driving mode to the manual driving mode or from the manual driving mode to the self-driving mode on the basis of a signal received from the user interface device 200.

8) Sensing Unit

The sensing unit 270 can detect a state of the vehicle. The sensing unit 270 may include at least one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the IMU sensor may include one or more of an acceleration sensor, a gyro sensor and a magnetic sensor.

The sensing unit 270 can generate vehicle state data on the basis of a signal generated from at least one sensor. Vehicle state data may be information generated on the basis of data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake panel, etc.

9) Position Data Generation Device

The position data generation device 280 can generate position data of the vehicle 10. The position data generation device 280 may include at least one of a global positioning system (GPS) and a differential global positioning system (DGPS). The position data generation device 280 can generate position data of the vehicle 10 on the basis of a signal generated from at least one of the GPS and the DGPS. According to an embodiment, the position data generation device 280 can correct position data on the basis of at least one of the inertial measurement unit (IMU) sensor of the sensing unit 270 and the camera of the object detection device 210. The position data generation device 280 may also be called a global navigation satellite system (GNSS).

The vehicle 10 may include an internal communication system 50. The plurality of electronic devices included in the vehicle 10 can exchange signals through the internal communication system 50. The signals may include data. The internal communication system 50 can use at least one communication protocol (e.g., CAN, LIN, FlexRay, MOST or Ethernet).

(3) Components of Autonomous Device

Figure 7:
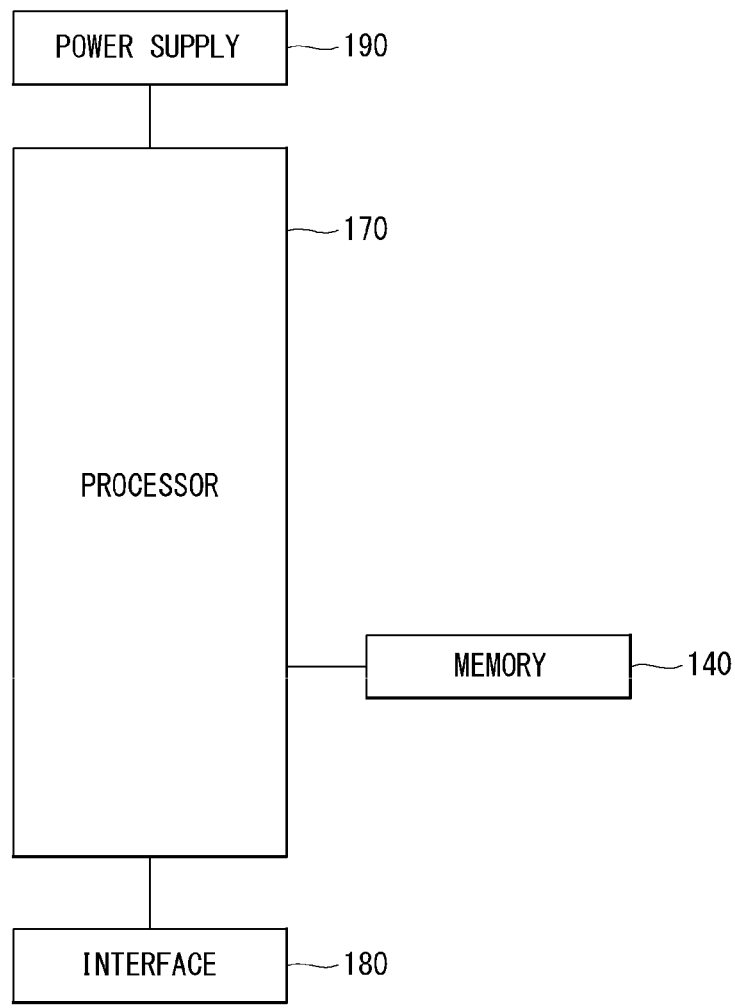
FIG. 7 is a flowchart showing a vehicle control method according to an embodiment of the present disclosure.

FIG. 7 is a control block diagram of the autonomous device according to an embodiment of the present disclosure.

Referring to FIG. 7, the autonomous driving device 260 may include a memory 140, a processor 170, an interface 180 and a power supply 190.

The memory 140 is electrically connected to the processor 170. The memory 140 can store basic data with respect to units, control data for operation control of units, and input/output data. The memory 140 can store data processed in the processor 170. Hardware-wise, the memory 140 can be configured as at least one of a ROM, a RAM, an EPROM, a flash drive and a hard drive. The memory 140 can store various types of data for overall operation of the autonomous driving device 260, such as a program for processing or control of the processor 170. The memory 140 may be integrated with the processor 170. According to an embodiment, the memory 140 may be categorized as a subcomponent of the processor 170.

The interface 180 can exchange signals with at least one electronic device included in the vehicle 10 in a wired or wireless manner. The interface 180 can exchange signals with at least one of the object detection device 210, the communication device 220, the driving operation device 230, the main ECU 240, the driving control device 250, the sensing unit 270 and the position data generation device 280 in a wired or wireless manner. The interface 180 can be configured using at least one of a communication module, a terminal, a pin, a cable, a port, a circuit, an element and a device.

The power supply 190 can provide power to the autonomous driving device 260. The power supply 190 can be provided with power from a power source (e.g., a battery) included in the vehicle 10 and supply the power to each unit of the autonomous driving device 260. The power supply 190 can operate according to a control signal supplied from the main ECU 240. The power supply 190 may include a switched-mode power supply (SMPS).

The processor 170 can be electrically connected to the memory 140, the interface 180 and the power supply 190 and exchange signals with these components. The processor 170 can be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 can be operated by power supplied from the power supply 190. The processor 170 can receive data, process the data, generate a signal and provide the signal while power is supplied thereto.

The processor 170 can receive information from other electronic devices included in the vehicle 10 through the interface 180. The processor 170 can provide control signals to other electronic devices in the vehicle 10 through the interface 180.

The autonomous driving device 260 may include at least one printed circuit board (PCB). The memory 140, the interface 180, the power supply 190 and the processor 170 may be electrically connected to the PCB.

(4) Operation of Autonomous Device

Figure 8:
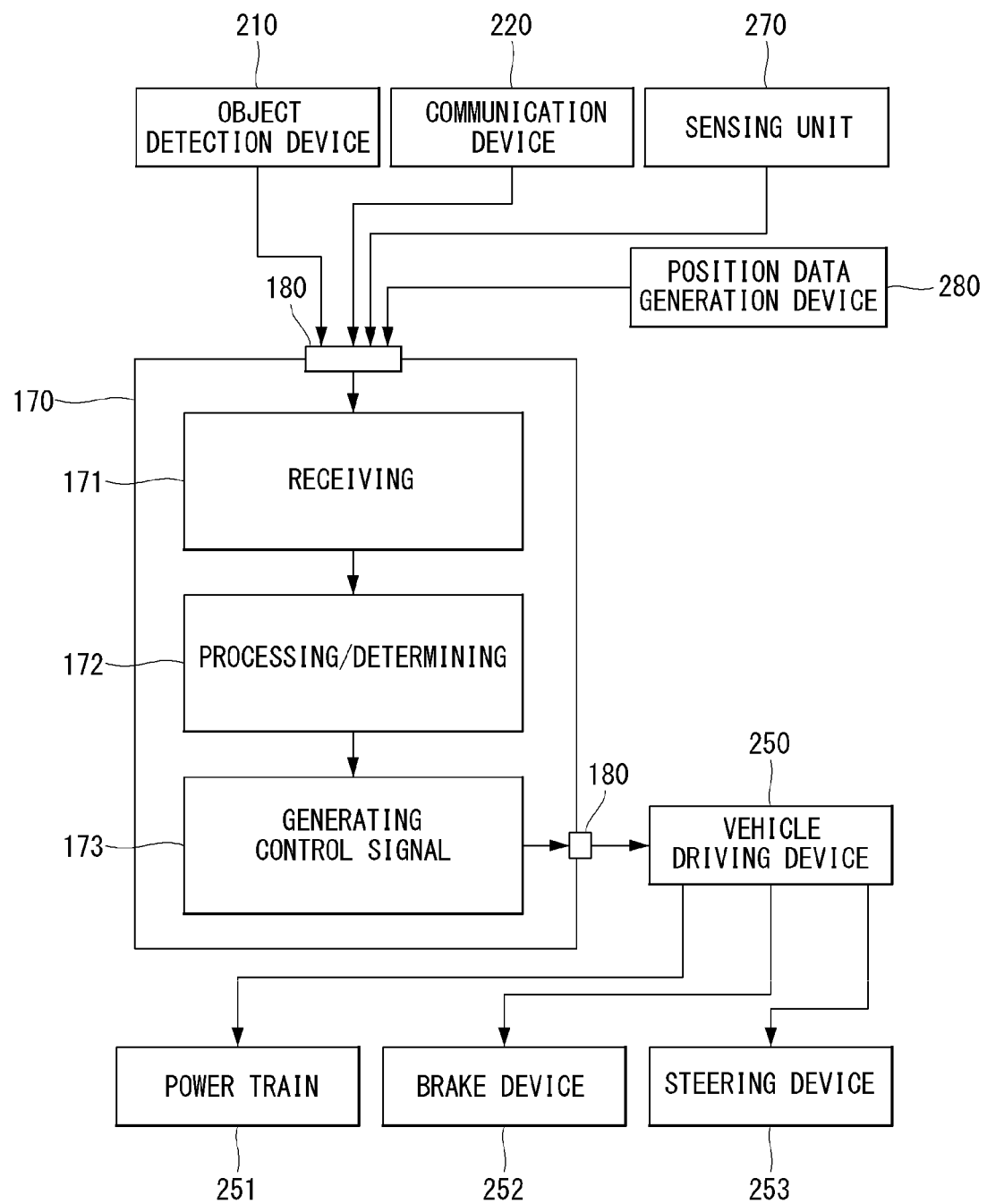
FIG. 8 is a flowchart showing a vehicle control method in which the propensity for driving of a user has been reflected to control of autonomous driving.

FIG. 8 is a diagram showing a signal flow in an autonomous vehicle according to an embodiment of the present disclosure.

1) Reception Operation

Referring to FIG. 8, the processor 170 can perform a reception operation. The processor 170 can receive data from at least one of the object detection device 210, the communication device 220, the sensing unit 270 and the position data generation device 280 through the interface 180. The processor 170 can receive object data from the object detection device 210. The processor 170 can receive HD map data from the communication device 220. The processor 170 can receive vehicle state data from the sensing unit 270. The processor 170 can receive position data from the position data generation device 280.

2) Processing/Determination Operation

The processor 170 can perform a processing/determination operation. The processor 170 can perform the processing/determination operation on the basis of traveling situation information. The processor 170 can perform the processing/determination operation on the basis of at least one of object data, HD map data, vehicle state data and position data.

2.1) Driving Plan Data Generation Operation

The processor 170 can generate driving plan data. For example, the processor 170 may generate electronic horizon data. The electronic horizon data can be understood as driving plan data in a range from a position at which the vehicle 10 is located to a horizon. The horizon can be understood as a point a predetermined distance before the position at which the vehicle 10 is located on the basis of a predetermined traveling route. The horizon may refer to a point at which the vehicle can arrive after a predetermined time from the position at which the vehicle 10 is located along a predetermined traveling route.

The electronic horizon data can include horizon map data and horizon path data.

2.1.1) Horizon Map Data

The horizon map data may include at least one of topology data, road data, HD map data and dynamic data. According to an embodiment, the horizon map data may include a plurality of layers. For example, the horizon map data may include a first layer that matches the topology data, a second layer that matches the road data, a third layer that matches the HD map data, and a fourth layer that matches the dynamic data. The horizon map data may further include static object data.

The topology data may be explained as a map created by connecting road centers. The topology data is suitable for approximate display of a location of a vehicle and may have a data form used for navigation for drivers. The topology data may be understood as data about road information other than information on driveways. The topology data may be generated on the basis of data received from an external server through the communication device 220. The topology data may be based on data stored in at least one memory included in the vehicle 10.

The road data may include at least one of road slope data, road curvature data and road speed limit data. The road data may further include no-passing zone data. The road data may be based on data received from an external server through the communication device 220. The road data may be based on data generated in the object detection device 210.

The HD map data may include detailed topology information in units of lanes of roads, connection information of each lane, and feature information for vehicle localization (e.g., traffic signs, lane marking/attribute, road furniture, etc.). The HD map data may be based on data received from an external server through the communication device 220.

The dynamic data may include various types of dynamic information which can be generated on roads. For example, the dynamic data may include construction information, variable speed road information, road condition information, traffic information, moving object information, etc. The dynamic data may be based on data received from an external server through the communication device 220. The dynamic data may be based on data generated in the object detection device 210.

The processor 170 can provide map data in a range from a position at which the vehicle 10 is located to the horizon.

2.1.2) Horizon Path Data

The horizon path data may be explained as a trajectory through which the vehicle 10 can travel in a range from a position at which the vehicle 10 is located to the horizon. The horizon path data may include data indicating a relative probability of selecting a road at a decision point (e.g., a fork, a junction, a crossroad, or the like). The relative probability may be calculated on the basis of a time taken to arrive at a final destination. For example, if a time taken to arrive at a final destination is shorter when a first road is selected at a decision point than that when a second road is selected, a probability of selecting the first road can be calculated to be higher than a probability of selecting the second road.

The horizon path data can include a main path and a sub-path. The main path may be understood as a trajectory obtained by connecting roads having a high relative probability of being selected. The sub-path can be branched from at least one decision point on the main path. The sub-path may be understood as a trajectory obtained by connecting at least one road having a low relative probability of being selected at at least one decision point on the main path.

3) Control Signal Generation Operation

The processor 170 can perform a control signal generation operation. The processor 170 can generate a control signal on the basis of the electronic horizon data. For example, the processor 170 may generate at least one of a power train control signal, a brake device control signal and a steering device control signal on the basis of the electronic horizon data.

The processor 170 can transmit the generated control signal to the driving control device 250 through the interface 180. The driving control device 250 can transmit the control signal to at least one of a power train 251, a brake device 252 and a steering device 254.

Cabin

Figure 9:
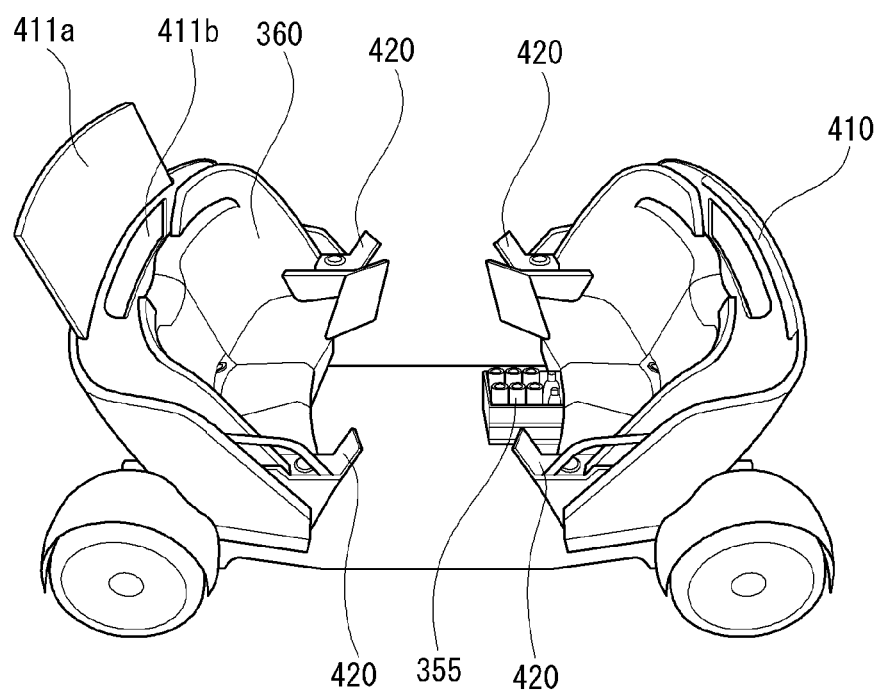
FIG. 9 is a flowchart showing vehicle control in which external data have been reflected to control of autonomous driving.
Figure 10:
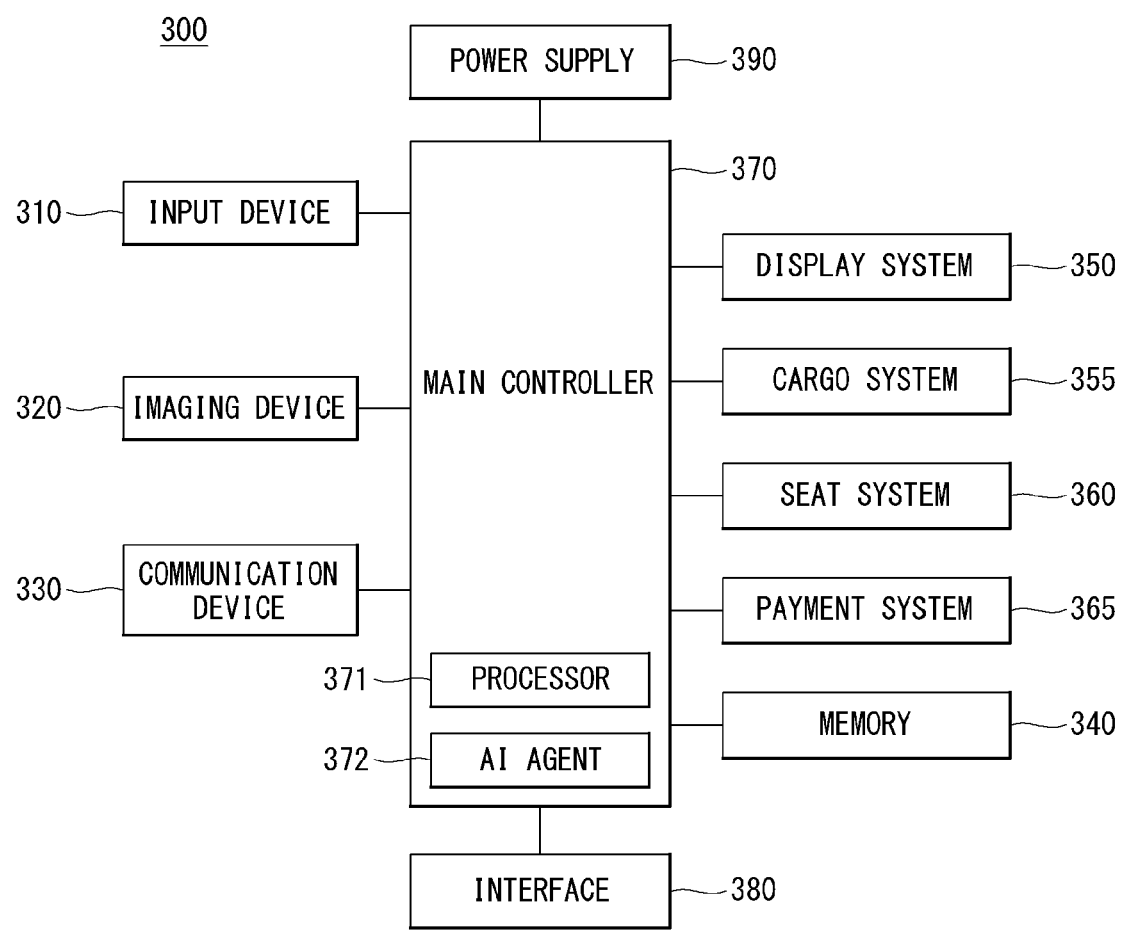
FIG. 10 is a flowchart showing a method of reflecting the propensity for driving of a user to autonomous driving control within a real-time sensing-based control range.

FIG. 9 is a diagram showing the interior of the vehicle according to an embodiment of the present disclosure. FIG. 10 is a block diagram referred to in description of a cabin system for a vehicle according to an embodiment of the present disclosure.

(1) Components of Cabin

Referring to FIGS. 9 and 10, a cabin system 300 for a vehicle (hereinafter, a cabin system) can be defined as a convenience system for a user who uses the vehicle 10. The cabin system 300 can be explained as a high-end system including a display system 350, a cargo system 355, a seat system 360 and a payment system 365. The cabin system 300 may include a main controller 370, a memory 340, an interface 380, a power supply 390, an input device 310, an imaging device 320, a communication device 330, the display system 350, the cargo system 355, the seat system 360 and the payment system 365. The cabin system 300 may further include components in addition to the components described in this specification or may not include some of the components described in this specification according to embodiments.

1) Main Controller

The main controller 370 can be electrically connected to the input device 310, the communication device 330, the display system 350, the cargo system 355, the seat system 360 and the payment system 365 and exchange signals with these components. The main controller 370 can control the input device 310, the communication device 330, the display system 350, the cargo system 355, the seat system 360 and the payment system 365. The main controller 370 may be realized using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The main controller 370 may be configured as at least one sub-controller. The main controller 370 may include a plurality of sub-controllers according to an embodiment. The plurality of sub-controllers may individually control the devices and systems included in the cabin system 300. The devices and systems included in the cabin system 300 may be grouped by function or grouped on the basis of seats on which a user can sit.

The main controller 370 may include at least one processor 371. Although FIG. 6 illustrates the main controller 370 including a single processor 371, the main controller 371 may include a plurality of processors. The processor 371 may be categorized as one of the above-described sub-controllers.

The processor 371 can receive signals, information or data from a user terminal through the communication device 330. The user terminal can transmit signals, information or data to the cabin system 300.

The processor 371 can identify a user on the basis of image data received from at least one of an internal camera and an external camera included in the imaging device. The processor 371 can identify a user by applying an image processing algorithm to the image data. For example, the processor 371 may identify a user by comparing information received from the user terminal with the image data. For example, the information may include at least one of route information, body information, fellow passenger information, baggage information, position information, preferred content information, preferred food information, disability information and use history information of a user.

The main controller 370 may include an artificial intelligence (AI) agent 372. The AI agent 372 can perform machine learning on the basis of data acquired through the input device 310. The AI agent 371 can control at least one of the display system 350, the cargo system 355, the seat system 360 and the payment system 365 on the basis of machine learning results.

2) Essential Components

The memory 340 is electrically connected to the main controller 370. The memory 340 can store basic data about units, control data for operation control of units, and input/output data. The memory 340 can store data processed in the main controller 370. Hardware-wise, the memory 340 may be configured using at least one of a ROM, a RAM, an EPROM, a flash drive and a hard drive. The memory 340 can store various types of data for the overall operation of the cabin system 300, such as a program for processing or control of the main controller 370. The memory 340 may be integrated with the main controller 370.

The interface 380 can exchange signals with at least one electronic device included in the vehicle 10 in a wired or wireless manner. The interface 380 may be configured using at least one of a communication module, a terminal, a pin, a cable, a port, a circuit, an element and a device.

The power supply 390 can provide power to the cabin system 300. The power supply 390 can be provided with power from a power source (e.g., a battery) included in the vehicle 10 and supply the power to each unit of the cabin system 300. The power supply 390 can operate according to a control signal supplied from the main controller 370. For example, the power supply 390 may be implemented as a switched-mode power supply (SMPS).

The cabin system 300 may include at least one printed circuit board (PCB). The main controller 370, the memory 340, the interface 380 and the power supply 390 may be mounted on at least one PCB.

3) Input Device

The input device 310 can receive a user input. The input device 310 can convert the user input into an electrical signal. The electrical signal converted by the input device 310 can be converted into a control signal and provided to at least one of the display system 350, the cargo system 355, the seat system 360 and the payment system 365. The main controller 370 or at least one processor included in the cabin system 300 can generate a control signal based on an electrical signal received from the input device 310.

The input device 310 may include at least one of a touch input unit, a gesture input unit, a mechanical input unit and a voice input unit. The touch input unit can convert a user's touch input into an electrical signal. The touch input unit may include at least one touch sensor for detecting a user's touch input. According to an embodiment, the touch input unit can realize a touch screen by integrating with at least one display included in the display system 350. Such a touch screen can provide both an input interface and an output interface between the cabin system 300 and a user. The gesture input unit can convert a user's gesture input into an electrical signal. The gesture input unit may include at least one of an infrared sensor and an image sensor for detecting a user's gesture input. According to an embodiment, the gesture input unit can detect a user's three-dimensional gesture input. To this end, the gesture input unit may include a plurality of light output units for outputting infrared light or a plurality of image sensors. The gesture input unit may detect a user's three-dimensional gesture input using TOF (Time of Flight), structured light or disparity. The mechanical input unit can convert a user's physical input (e.g., press or rotation) through a mechanical device into an electrical signal. The mechanical input unit may include at least one of a button, a dome switch, a jog wheel and a jog switch. Meanwhile, the gesture input unit and the mechanical input unit may be integrated. For example, the input device 310 may include a jog dial device that includes a gesture sensor and is formed such that it can be inserted/ejected into/from a part of a surrounding structure (e.g., at least one of a seat, an armrest and a door). When the jog dial device is parallel to the surrounding structure, the jog dial device can serve as a gesture input unit. When the jog dial device is protruded from the surrounding structure, the jog dial device can serve as a mechanical input unit. The voice input unit can convert a user's voice input into an electrical signal. The voice input unit may include at least one microphone. The voice input unit may include a beam forming MIC.

4) Imaging Device

The imaging device 320 can include at least one camera. The imaging device 320 may include at least one of an internal camera and an external camera. The internal camera can capture an image of the inside of the cabin. The external camera can capture an image of the outside of the vehicle. The internal camera can acquire an image of the inside of the cabin. The imaging device 320 may include at least one internal camera. It is desirable that the imaging device 320 include as many cameras as the number of passengers who can ride in the vehicle. The imaging device 320 can provide an image acquired by the internal camera. The main controller 370 or at least one processor included in the cabin system 300 can detect a motion of a user on the basis of an image acquired by the internal camera, generate a signal on the basis of the detected motion and provide the signal to at least one of the display system 350, the cargo system 355, the seat system 360 and the payment system 365. The external camera can acquire an image of the outside of the vehicle. The imaging device 320 may include at least one external camera. It is desirable that the imaging device 320 include as many cameras as the number of doors through which passengers ride in the vehicle. The imaging device 320 can provide an image acquired by the external camera. The main controller 370 or at least one processor included in the cabin system 300 can acquire user information on the basis of the image acquired by the external camera. The main controller 370 or at least one processor included in the cabin system 300 can authenticate a user or acquire body information (e.g., height information, weight information, etc.), fellow passenger information and baggage information of a user on the basis of the user information.

5) Communication Device

The communication device 330 can exchange signals with external devices in a wireless manner. The communication device 330 can exchange signals with external devices through a network or directly exchange signals with external devices. External devices may include at least one of a server, a mobile terminal and another vehicle. The communication device 330 may exchange signals with at least one user terminal. The communication device 330 may include an antenna and at least one of an RF circuit and an RF element which can implement at least one communication protocol in order to perform communication. According to an embodiment, the communication device 330 may use a plurality of communication protocols. The communication device 330 may switch communication protocols according to a distance to a mobile terminal.

For example, the communication device can exchange signals with external devices on the basis of C-V2X (Cellular V2X). For example, C-V2X may include sidelink communication based on LTE and/or sidelink communication based on NR. Details related to C-V2X will be described later.

For example, the communication device can exchange signals with external devices on the basis of DSRC (Dedicated Short Range Communications) or WAVE (Wireless Access in Vehicular Environment) standards based on IEEE 802.11p PHY/MAC layer technology and IEEE 1609 Network/Transport layer technology. DSRC (or WAVE standards) is communication specifications for providing an intelligent transport system (ITS) service through short-range dedicated communication between vehicle-mounted devices or between a roadside device and a vehicle-mounted device. DSRC may be a communication scheme that can use a frequency of 5.9 GHz and have a data transfer rate in the range of 3 Mbps to 27 Mbps. IEEE 802.11p may be combined with IEEE 1609 to support DSRC (or WAVE standards).

The communication device of the present disclosure can exchange signals with external devices using only one of C-V2X and DSRC. Alternatively, the communication device of the present disclosure can exchange signals with external devices using a hybrid of C-V2X and DSRC.

6) Display System

The display system 350 can display graphic objects. The display system 350 may include at least one display device. For example, the display system 350 may include a first display device 410 for common use and a second display device 420 for individual use.

6.1) Common Display Device

The first display device 410 may include at least one display 411 which outputs visual content. The display 411 included in the first display device 410 may be realized by at least one of a flat panel display, a curved display, a rollable display and a flexible display. For example, the first display device 410 may include a first display 411 which is positioned behind a seat and formed to be inserted/ejected into/from the cabin, and a first mechanism for moving the first display 411. The first display 411 may be disposed such that it can be inserted/ejected into/from a slot formed in a seat main frame. According to an embodiment, the first display device 410 may further include a flexible area control mechanism. The first display may be formed to be flexible and a flexible area of the first display may be controlled according to user position. For example, the first display device 410 may be disposed on the ceiling inside the cabin and include a second display formed to be rollable and a second mechanism for rolling or unrolling the second display. The second display may be formed such that images can be displayed on both sides thereof For example, the first display device 410 may be disposed on the ceiling inside the cabin and include a third display formed to be flexible and a third mechanism for bending or unbending the third display. According to an embodiment, the display system 350 may further include at least one processor which provides a control signal to at least one of the first display device 410 and the second display device 420. The processor included in the display system 350 can generate a control signal on the basis of a signal received from at last one of the main controller 370, the input device 310, the imaging device 320 and the communication device 330.

A display area of a display included in the first display device 410 may be divided into a first area 411a and a second area 411b. The first area 411a can be defined as a content display area. For example, the first area 411 may display at least one of graphic objects corresponding to can display entertainment content (e.g., movies, sports, shopping, food, etc.), video conferences, food menu and augmented reality screens. The first area 411a may display graphic objects corresponding to traveling situation information of the vehicle 10. The traveling situation information may include at least one of object information outside the vehicle, navigation information and vehicle state information. The object information outside the vehicle may include information on presence or absence of an object, positional information of an object, information on a distance between the vehicle and an object, and information on a relative speed of the vehicle with respect to an object. The navigation information may include at least one of map information, information on a set destination, route information according to setting of the destination, information on various objects on a route, lane information and information on the current position of the vehicle. The vehicle state information may include vehicle attitude information, vehicle speed information, vehicle tilt information, vehicle weight information, vehicle orientation information, vehicle battery information, vehicle fuel information, vehicle tire pressure information, vehicle steering information, vehicle indoor temperature information, vehicle indoor humidity information, pedal position information, vehicle engine temperature information, etc. The second area 411b can be defined as a user interface area. For example, the second area 411b may display an AI agent screen. The second area 411b may be located in an area defined by a seat frame according to an embodiment. In this case, a user can view content displayed in the second area 411b between seats. The first display device 410 may provide hologram content according to an embodiment. For example, the first display device 410 may provide hologram content for each of a plurality of users such that only a user who requests the content can view the content.

6.2) Display Device for Individual Use

The second display device 420 can include at least one display 421. The second display device 420 can provide the display 421 at a position at which only an individual passenger can view display content. For example, the display 421 may be disposed on an armrest of a seat. The second display device 420 can display graphic objects corresponding to personal information of a user. The second display device 420 may include as many displays 421 as the number of passengers who can ride in the vehicle. The second display device 420 can realize a touch screen by forming a layered structure along with a touch sensor or being integrated with the touch sensor. The second display device 420 can display graphic objects for receiving a user input for seat adjustment or indoor temperature adjustment.

7) Cargo System

The cargo system 355 can provide items to a user at the request of the user. The cargo system 355 can operate on the basis of an electrical signal generated by the input device 310 or the communication device 330. The cargo system 355 can include a cargo box. The cargo box can be hidden in a part under a seat. When an electrical signal based on user input is received, the cargo box can be exposed to the cabin. The user can select a necessary item from articles loaded in the cargo box. The cargo system 355 may include a sliding moving mechanism and an item pop-up mechanism in order to expose the cargo box according to user input. The cargo system 355 may include a plurality of cargo boxes in order to provide various types of items. A weight sensor for determining whether each item is provided may be embedded in the cargo box.

8) Seat System

The seat system 360 can provide a user customized seat to a user. The seat system 360 can operate on the basis of an electrical signal generated by the input device 310 or the communication device 330. The seat system 360 can adjust at least one element of a seat on the basis of acquired user body data. The seat system 360 may include a user detection sensor (e.g., a pressure sensor) for determining whether a user sits on a seat. The seat system 360 may include a plurality of seats on which a plurality of users can sit. One of the plurality of seats can be disposed to face at least another seat. At least two users can set facing each other inside the cabin.

9) Payment System

The payment system 365 can provide a payment service to a user. The payment system 365 can operate on the basis of an electrical signal generated by the input device 310 or the communication device 330. The payment system 365 can calculate a price for at least one service used by the user and request the user to pay the calculated price.

(2) Autonomous Vehicle Usage Scenarios

Figure 11:
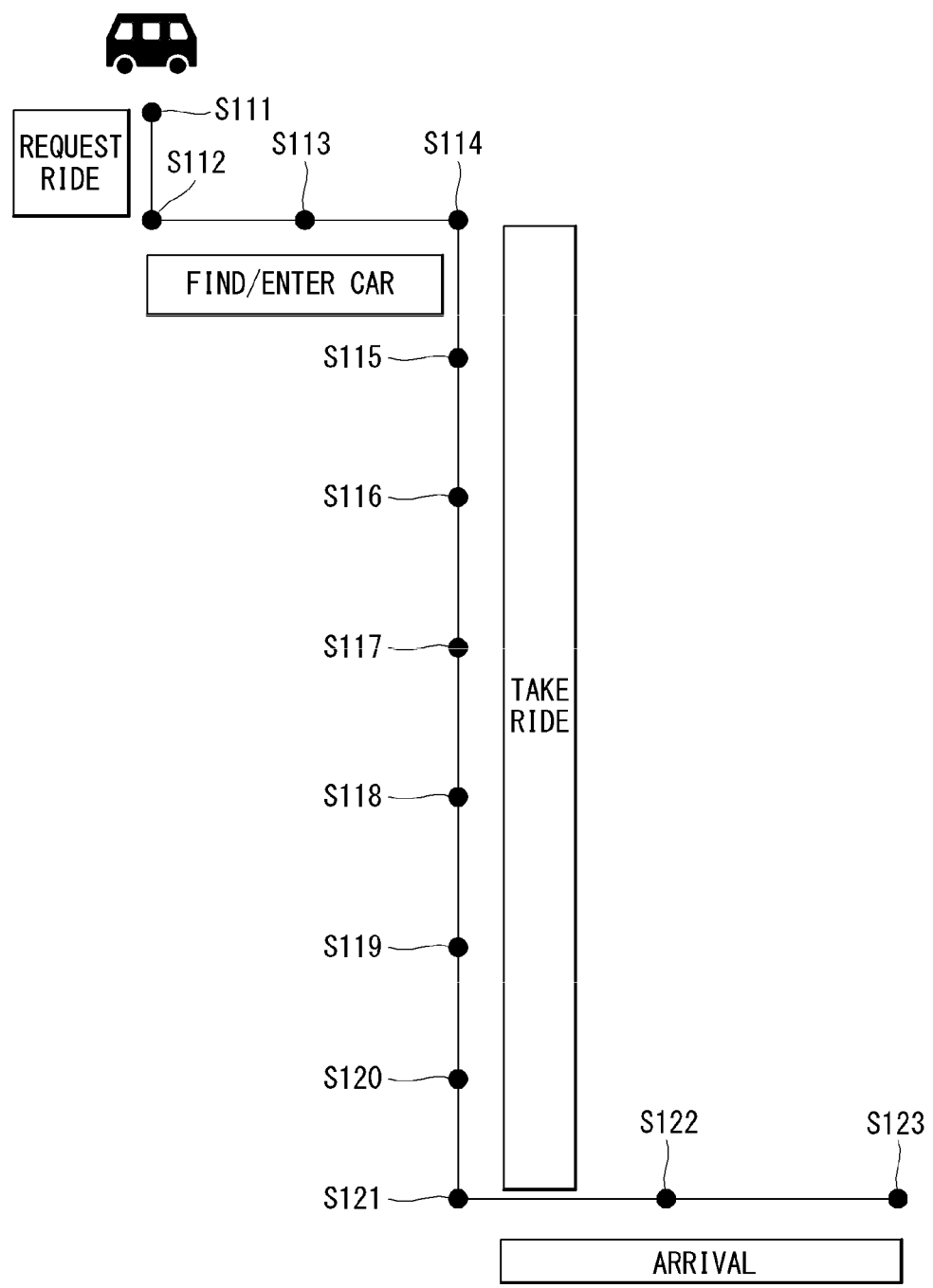
FIG. 11 is a flowchart showing a method of reflecting external data within a real-time sensing-based control range.

FIG. 11 is a diagram referred to in description of a usage scenario of a user according to an embodiment of the present disclosure.

1) Destination Prediction Scenario

A first scenario S111 is a scenario for prediction of a destination of a user. An application which can operate in connection with the cabin system 300 can be installed in a user terminal. The user terminal can predict a destination of a user on the basis of user's contextual information through the application. The user terminal can provide information on unoccupied seats in the cabin through the application.

2) Cabin Interior Layout Preparation Scenario

A second scenario S112 is a cabin interior layout preparation scenario. The cabin system 300 may further include a scanning device for acquiring data about a user located outside the vehicle. The scanning device can scan a user to acquire body data and baggage data of the user. The body data and baggage data of the user can be used to set a layout. The body data of the user can be used for user authentication. The scanning device may include at least one image sensor. The image sensor can acquire a user image using light of the visible band or infrared band.

The seat system 360 can set a cabin interior layout on the basis of at least one of the body data and baggage data of the user. For example, the seat system 360 may provide a baggage compartment or a car seat installation space.

3) User Welcome Scenario

A third scenario S113 is a user welcome scenario. The cabin system 300 may further include at least one guide light. The guide light can be disposed on the floor of the cabin. When a user riding in the vehicle is detected, the cabin system 300 can turn on the guide light such that the user sits on a predetermined seat among a plurality of seats. For example, the main controller 370 may realize a moving light by sequentially turning on a plurality of light sources over time from an open door to a predetermined user seat.

4) Seat Adjustment Service Scenario

A fourth scenario S114 is a seat adjustment service scenario. The seat system 360 can adjust at least one element of a seat that matches a user on the basis of acquired body information.

5) Personal Content Provision Scenario

A fifth scenario S115 is a personal content provision scenario. The display system 350 can receive user personal data through the input device 310 or the communication device 330. The display system 350 can provide content corresponding to the user personal data.

6) Item Provision Scenario

A sixth scenario S116 is an item provision scenario. The cargo system 355 can receive user data through the input device 310 or the communication device 330. The user data may include user preference data, user destination data, etc. The cargo system 355 can provide items on the basis of the user data.

7) Payment Scenario

A seventh scenario S117 is a payment scenario. The payment system 365 can receive data for price calculation from at least one of the input device 310, the communication device 330 and the cargo system 355. The payment system 365 can calculate a price for use of the vehicle by the user on the basis of the received data. The payment system 365 can request payment of the calculated price from the user (e.g., a mobile terminal of the user).

8) Display System Control Scenario of User

An eighth scenario S118 is a display system control scenario of a user. The input device 310 can receive a user input having at least one form and convert the user input into an electrical signal. The display system 350 can control displayed content on the basis of the electrical signal.

9) AI Agent Scenario

A ninth scenario S119 is a multi-channel artificial intelligence (AI) agent scenario for a plurality of users. The AI agent 372 can discriminate user inputs from a plurality of users. The AI agent 372 can control at least one of the display system 350, the cargo system 355, the seat system 360 and the payment system 365 on the basis of electrical signals obtained by converting user inputs from a plurality of users.

10) Multimedia Content Provision Scenario for Multiple Users

A tenth scenario S120 is a multimedia content provision scenario for a plurality of users. The display system 350 can provide content that can be viewed by all users together. In this case, the display system 350 can individually provide the same sound to a plurality of users through speakers provided for respective seats. The display system 350 can provide content that can be individually viewed by a plurality of users. In this case, the display system 350 can provide individual sound through a speaker provided for each seat.

11) User Safety Secure Scenario

An eleventh scenario S121 is a user safety secure scenario. When information on an object around the vehicle which threatens a user is acquired, the main controller 370 can control an alarm with respect to the object around the vehicle to be output through the display system 350.

12) Personal Belongings Loss Prevention Scenario

A twelfth scenario S122 is a user's belongings loss prevention scenario. The main controller 370 can acquire data about user's belongings through the input device 310. The main controller 370 can acquire user motion data through the input device 310. The main controller 370 can determine whether the user exits the vehicle leaving the belongings in the vehicle on the basis of the data about the belongings and the motion data. The main controller 370 can control an alarm with respect to the belongings to be output through the display system 350.

13) Alighting Report Scenario

A thirteenth scenario S123 is an alighting report scenario. The main controller 370 can receive alighting data of a user through the input device 310. After the user exits the vehicle, the main controller 370 can provide report data according to alighting to a mobile terminal of the user through the communication device 330. The report data can include data about a total charge for using the vehicle 10.

The above-describe 5G communication technology can be combined with methods proposed in the present disclosure which will be described later and applied or can complement the methods proposed in the present disclosure to make technical features of the present disclosure concrete and clear.

Hereafter, a vehicle control method and apparatus for accurately recognizing an object in an autonomous driving system according to an embodiment of the present disclosure is described. In object recognition using common cameras, the recognition accuracy is measured on the basis of environment information of learned data, so when the current environment information and the environment information of the learning data are different, the accuracy is unavoidably low.

In order to increase object recognition accuracy in various environments, much learning data are required and learning for object recognition takes much time.

When object recognition accuracy decreases, it is impossible to recognize an object unless a network is connected, even though it is required to receive a result having high accuracy through communication with another vehicle/server.

Further, existing headlights are used in lighting output/non-output states to increase object recognition accuracy, but it is not the lighting output sufficient to improve the object recognition accuracy.

Accordingly, a method and apparatus for controlling a vehicle in an autonomous driving system according to an embodiment of the present disclosure provides a technology that infers a currently required assistant type when object recognition accuracy decreases, and secures object recognition accuracy by changing headlight illumination fitted to a corresponding type.

Figure 12:
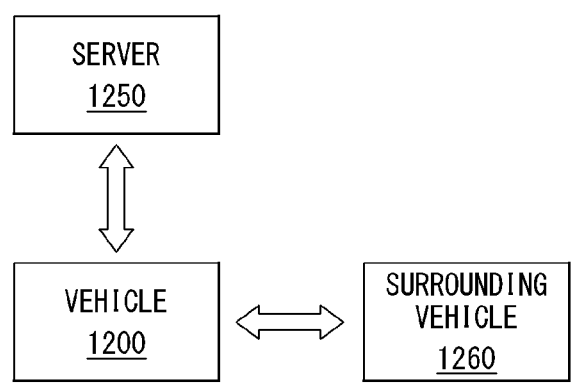
FIG. 12 is a diagram briefly showing an autonomous driving system according to an embodiment of the present disclosure.

FIG. 12 is a diagram briefly showing an autonomous driving system according to an embodiment of the present disclosure.

Referring to FIG. 12, an autonomous driving system may include a vehicle 1200 on which control according to an embodiment of the present disclosure is performed, a server that provides a light setting for object recognition and an algorithm for object recognition while communicating with the vehicle 1200, and a surrounding vehicle 1260 that is positioned around the vehicle 1200 and assists object recognition of the vehicle 1200.

The vehicle 1200 and the surrounding vehicle 1260 of FIG. 12 may be configured to be substantially the same as the vehicle 10 described through FIGS. 5 to 11. The server 1250 can provide information required for driving of the vehicle 1200 or can receive and store information related to driving from the vehicle 1200 while communicating with the vehicle 1200.

In an embodiment of the present disclosure, the vehicle 1200 sets brightness of headlights to be fitted to a surrounding environment, and resets the brightness of the headlights when detecting an object with low recognition accuracy while being driven, thereby being able to increase recognition accuracy of the object.

Here, communication between the vehicle 1200 and the server 1250 or the surrounding vehicle 1260 can be used. For example, the vehicle 1200 can receive headlight brightness setting information (a basic brightness value) corresponding to a surrounding environment (external illumination) from the server 1250 to set the brightness of the headlights to be fitted to the surrounding environment (external illumination) in the early stage. Further, in order to receive assistance (V2X-indirect assistance) from a vehicle positioned around to recognize an object with low recognition accuracy, the vehicle 1200 can receive a message for a V2X-indirect assistance request (V2X-indirect assistance request message) from the surrounding vehicle 1260 When receiving the V2X-indirect assistance request message, the surrounding vehicle 1260 can change the headlight setting to radiate light to the object from the headlights, and can transmit a headlight setting change confirmation message to the vehicle 200. The network infrastructures and signal transmission/reception procedures through FIGS. 1 to 4 may be applied to communication between the vehicle 1200 and the server 1250 or communication between the vehicle 1200 and the surrounding vehicle 1260.

Figure 13:
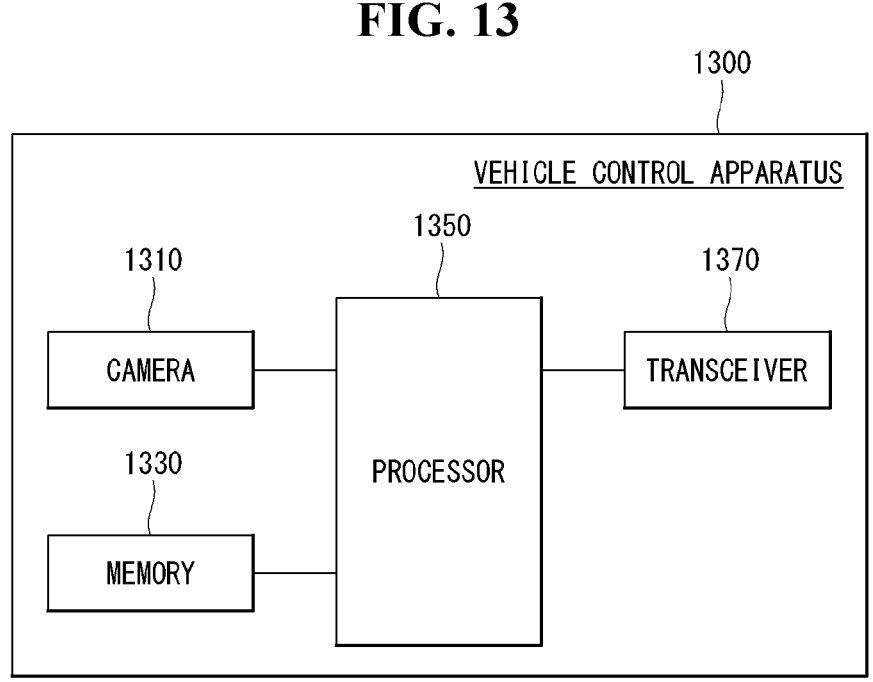
FIG. 13 is a block diagram showing an apparatus for controlling a vehicle in an autonomous driving system according to an embodiment of the present disclosure.

FIG. 13 is a block diagram showing a vehicle control apparatus in an autonomous driving system according to an embodiment of the present disclosure. The vehicle control apparatus 1300 of FIG. 13 is an example the apparatus configured in the vehicle 1200 of FIG. 12 to control the vehicle 1200.

The vehicle control apparatus 1300 of FIG. 13 may be configured as a part of the autonomous device 26 described with reference to FIG. 5. For example, a processor 1350 of FIG. 13 can be composed of at least one processing circuitry for controlling the function of the vehicle 1200 and can perform the same functions as those of the driving operation device 230, the main ECU 240, and the vehicle driving device 250 of FIG. 6. Further, the processor 1350 may be configured to perform functions the same as or similar to those of the processor 170 shown in FIGS. 7 and 8, or the processor 371 or the AI agent 372 included in the main controller 370 of FIG. 10.

A camera 1310 of FIG. 13, which is a component functionally combined with the processor 1350, can generate image data around the vehicle 1200. Further, the camera 1310 may be composed of at least one image sensor for generating image data. Further, the camera 1310 of FIG. 13 may perform the same function as the object detection device 210 of FIGS. 6 and 8 and may be configured as a part of the imaging device 320 of FIG. 11.

A memory 1330 of FIG. 13, which is a component functionally combined with the processor 1350, stores data for controlling the vehicle 1200. The memory 1300 may be composed of at least one memory element for storing data. The memory 1300 of FIG. 13 may be configured to perform the same function as the memory 140 of FIG. 7.

A transceiver 1370 of FIG. 13, which is a component functionally combined with the processor 1350, transmits or receives data for controlling the vehicle 1200. The transceiver 1370 may include at least one antenna for transmitting or receiving signals, an RF processing module, a frequency converter, a baseband processing module. The transceiver 1370 of FIG. 13 may be configured to be the same as the first communication device 910 or the second communication device 920 of FIG. 1 or may perform the same function as the communication device 220 of FIGS. 6 and 8.

The components of the vehicle control apparatus 1300 shown in FIG. 13 are only examples, and various components for control of a vehicle may be additionally included or at least some of the components shown in FIG. 13 may be omitted or replaced.

Figure 14:
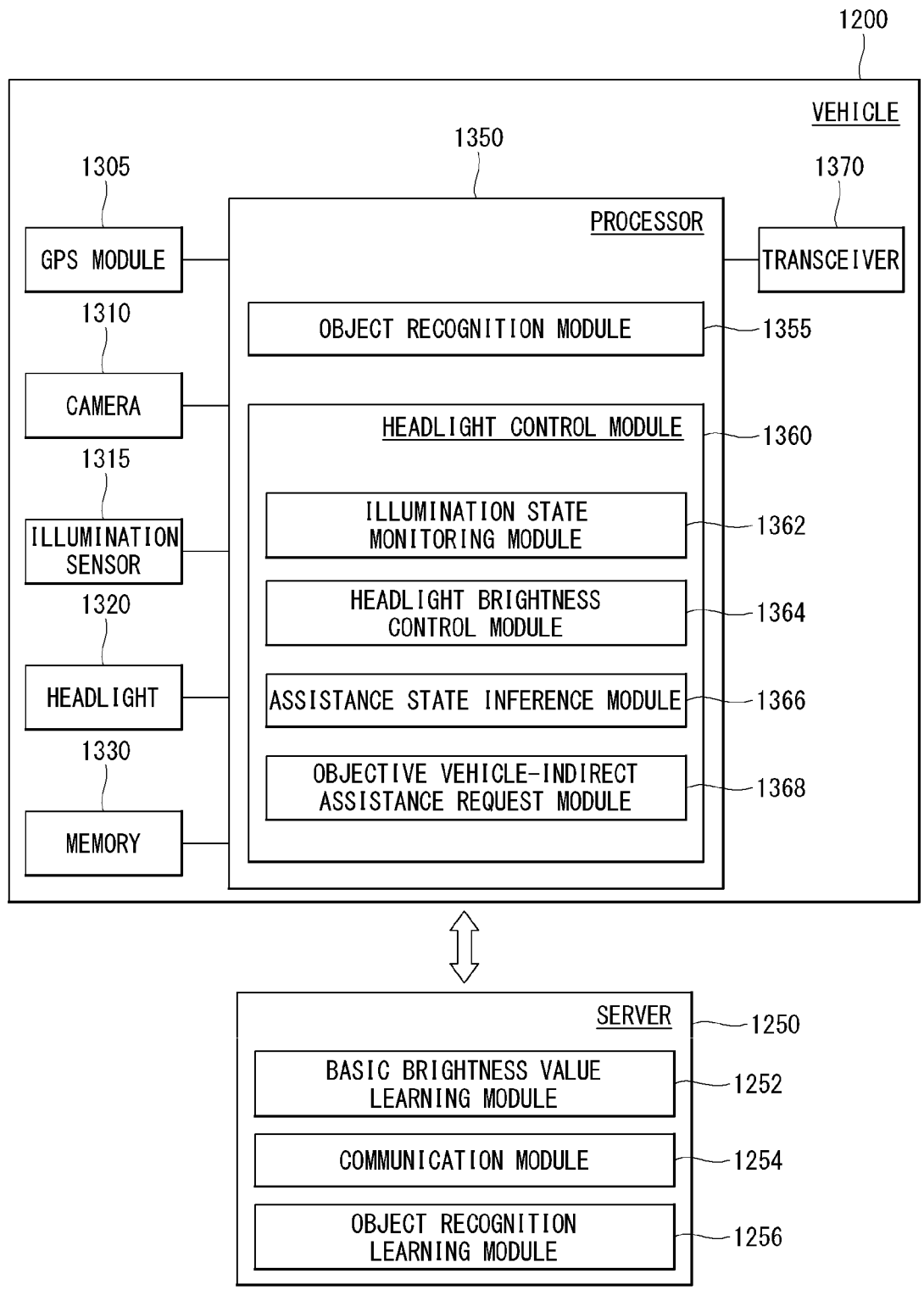
FIG. 14 is a flowchart showing a method for controlling a vehicle in an autonomous driving system according to an embodiment of the present disclosure.

FIG. 14 is a block diagram illustrating an example of a detailed configuration for controlling a vehicle in an autonomous driving system according to an embodiment of the present disclosure. FIG. 14 shows an example of a detailed configuration of the vehicle 1200 and the server 1250 of the present disclosure.

Referring to FIG. 14, the vehicle 1200 may include a GPS module 1305, a camera 1310, an illumination sensor 1315, headlights 1320, a memory 1330, a processor 1350, and a transceiver 1370, and the server 1250 may include a basic brightness value learning module 1252, a communication module 1254, and an object recognition learning module 1256. In FIG. 14, the camera 1310, the memory 1330, the processor 1350, and the transceiver 1370 of the vehicle 1200 may be configured to be respectively the same as the camera 1310, the memory 1330, the processor 1350, and the transceiver 1370 of the vehicle control apparatus 1300 of FIG. 13. Further, the processor 1350 may include an object recognition module 1355 and a headlight control module 1360, and the headlight control module 1360 may include an illumination state monitoring module 1362, a headlight brightness control module 1364, an assistance state inference module 1366, and an objective vehicle-indirect assistance request module 1368.

The GPS module 1305 can acquire position information (position coordinates) of the vehicle 1200 using a global positioning system (GPS) and can provide the acquired position information of the vehicle 1200 to the processor 1350. The GPS module may also be referred to as a position information acquirer.

The illumination sensor 1315 can acquire information about illumination outside the vehicle 1200 and can provide the acquired external illumination to the processor 1350.

The headlights 1320 are usually disposed on the front of the frame of the vehicle 1200 and output light forward from the vehicle. The headlights 1320 may be set light corresponding to a brightness value that is controlled by the headlight brightness control module 1364.

The object recognition module 1355 recognizes an object positioned in the route of or ahead of the vehicle 1200. For example, the object recognition module 1355 can recognize objects (e.g., another vehicle, a pedestrian, a traffic light, a sign, an obstacle) positioned ahead of the vehicle 1200 from image data acquired from the camera 1310 and can provide information about the objects to the headlight control module 1360 or a module (e.g., the driving operation device 230 of FIG. 6) controlling a vehicle in the processor 1350.

According to an embodiment of the present disclosure, the object recognition module 1355 can determine a recognition error (or recognition accuracy of each of objects positioned ahead of the vehicle 1200 together with the recognition information of the objects. For example, in the objects positioned ahead of the vehicle 1200, it is possible to have 0.1 as a recognition error (or recognition accuracy 0.9) for a forwarding vehicle, 0.2 as a recognition error (or recognition accuracy 0.8) for a pedestrian, or 0.7 as a recognition error (or recognition accuracy 0.3) for a sign. When an object having a recognition error larger than a predetermined range is found out from objects recognized by the object recognition module 1355, a procedure of changing the setting of the headlights by the headlight control module 1360 can be performed.

The headlight control module 1360 may be configured to determine whether to output light and the light brightness value of the headlights 1320 of the vehicle 1200. In more detail, the illumination state monitoring module 1362 off the headlight control module 1360 can acquire information about external illumination of the vehicle 1200. The headlight brightness control module 1364 can determine the brightness of light on the basis of information about the external illumination acquired by the illumination state monitoring module 1362. The assistance state inference module 1366 can compare the external illumination of the vehicle 1200 acquired by the illumination state monitoring module 1362 with learning brightness corresponding to an environment of the vehicle 1200 and can determine an assistance method in accordance with the comparison result. When it is found out that direct assistance is required, by the assistance state inference module 1366, the objective vehicle-indirect assistance request module 1368 can perform V2X-indirect assistance that changes the headlight setting of the surrounding vehicle 1260.

Figure 15:
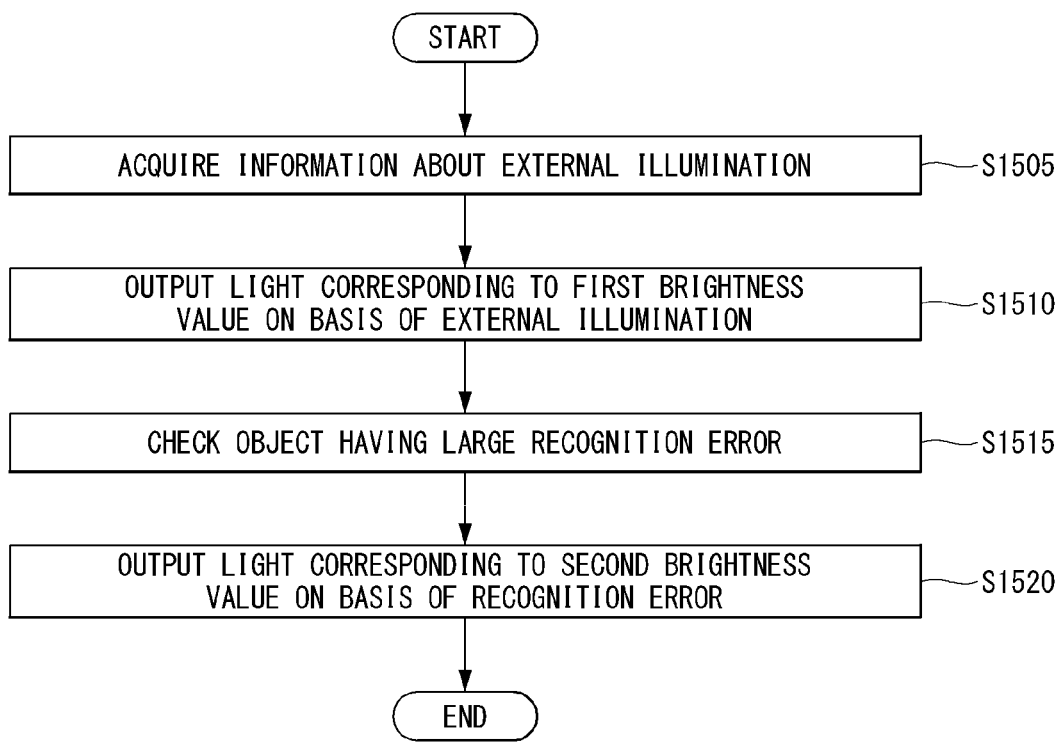
FIG. 15 is a block diagram illustrating an embodiment of a detailed configuration for controlling a vehicle in an autonomous driving system according to an embodiment of the present disclosure.

In FIG. 15, the illumination state monitoring module 1362, the headlight brightness control module 1364, the assistance state inference module 1366, and the objective vehicle-indirect assistance request module 1368 are shown like being configured as separate modules, but the present disclosure is not limited to the configuration of FIG. 15 and the modules included in the headlight control module 1360 may be configured as one processing circuit. In other words, the operations of the illumination state monitoring module 1362, the headlight brightness control module 1364, the assistance state inference module 1366, and the objective vehicle-indirect assistance request module 1368 can be implemented by one module (headlight control module 1360).

Similarly, in FIG. 15, the object recognition module 1355 and the headlight control module 1360 are shown like being configured as separate modules, but the present disclosure is not limited to the configuration of FIG. 15 and the modules included in the processor 1350 may be configured as one processing circuit. In other words, the operations of the object recognition module 1355 and the headlight control module 1360 can be implemented by one processing unit (processor 1350).

The basic brightness value learning module 1252 of the server 1250 can determine a basic brightness value corresponding to external illumination of the vehicle 1200 transmitted by the transceiver 1370 of the vehicle 1200. The communication module 1254 of the server 1250 may be configured to be able to transmit/receive data to/from the transceiver of the vehicle 1200. Further, the object recognition learning module 1256 of the server 1250 can reflect object recognition information (object information and recognition errors), external illumination, and headlight setting information of the vehicle 1200 received by the communication module 1254 to a database related to object recognition, and can transmit updated object recognition information to the vehicle 1200 through the communication module 1254. A detail operation that is performed by each of hardware components shown in FIGS. 13 and 14 is described hereafter with reference to FIGS. 15 to 3.

FIG. 15 is a flowchart showing a method for controlling a vehicle in an autonomous driving system according to an embodiment of the present disclosure.

Referring to FIG. 15, a method for controlling a vehicle 1200 in an autonomous driving system may include acquiring information about external illumination of the vehicle 1200 (S1505), outputting light corresponding to a first brightness value that is determined on the basis of the information about the external illumination of the vehicle (S1510); checking an object having a recognition error larger that a predetermined range while outputting the light corresponding to the first brightness value (S1515); and outputting light corresponding to a second brightness value that is determined on the basis of the recognition error of the object (S1520).

Before step S1505, the processor 1350 can download an algorithm for object recognition from the server 1250 and can store the downloaded algorithm for object recognition in the memory 1330. Thereafter, the processor 1350 can learn data required for the algorithm for object recognition in accordance with driving data of the vehicle 1200 and can update the algorithm for object recognition on the basis of the learned data.

The algorithm for object recognition of the vehicle 1200 can use information about the brightness (illumination) of image data used for learning as a tag. That is, the processor 1350 can extract information about external illumination of the vehicle 1200 from image data generated by the camera 1310, can tag the extracted information about the external illumination to the image data, and can store the information in the memory 1330. Accordingly, the algorithm for object recognition can consider information about various brightness (illumination) states when recognizing objects and the processor 1350 can have learning environment brightness in a wide range. Here, the learning environment brightness can show the range of recognizable brightness that is the range of brightness (illumination) having high accuracy.

For example, when items of data average brightness for a data environment of a cloudy day and a data environment of a rainy data, which are data collection environments of an algorithm A for object recognition, are respectively 3.15 kLx and 3 kLx, the learning environment brightness of the algorithm A for object recognition is 3.0-3.15 kLx (±0.5 kLx). Further, when the data average brightness for a sunny day environment that is a data collection environment of an algorithm B for object recognition is 45.34 kLx, the learning environment brightness is 45 kLx(±0.5 kLx). In this case, the learning environment brightness has a recognition error in a range in which it is determined that high accuracy can be secured. Object recognition processing during driving is performed in the vehicle, which can be considered as processing by edge computing of a device-driven block.

In step S1505, the illumination state monitoring module 1362 of the processor 1350 can acquire information about external illumination corresponding to the surrounding environment of the vehicle 1200 from image data generated from the camera 1310. In another embodiment, the processor 1350 can acquire information about external illumination from illumination value data measured from the illumination sensor 1315 or can receive information about external illumination from the server 1350 by using position information of the vehicle 1200 acquired from the GPS 1305.

In step S1510, the headlight brightness control module 1364 of the processor 1350 can control the headlights 1370 to output light corresponding to a first brightness value that is determined on the basis of the information about external illumination acquired in step S1405. An example of a process of determining the first brightness value and outputting light corresponding to the first brightness value is described with reference to FIGS. 16 to 19.

In steps S1515, the object recognition module 1355 of the processor 1350 can find out an object having a recognition error larger than a predetermined range while outputting light corresponding to the first brightness value. In other words, the object recognition module 1355 can detect an object having recognition accuracy lower than a reference value from objects that are recognized during driving while outputting light corresponding to the first brightness value.

In step S1520, the headlight brightness control module 1364 of the processor 1350 can output light corresponding to a second brightness value that is determined on the basis of a recognition error of an object. Here, a process of determining the second brightness value that is a brightness value changed on the basis of a recognition error of an object is described with reference to FIGS. 20 to 27. It is possible to improve recognition accuracy of an object by adjusting the brightness of light output by the headlights in correspondence to detection of an object having a large error.

Figure 16:
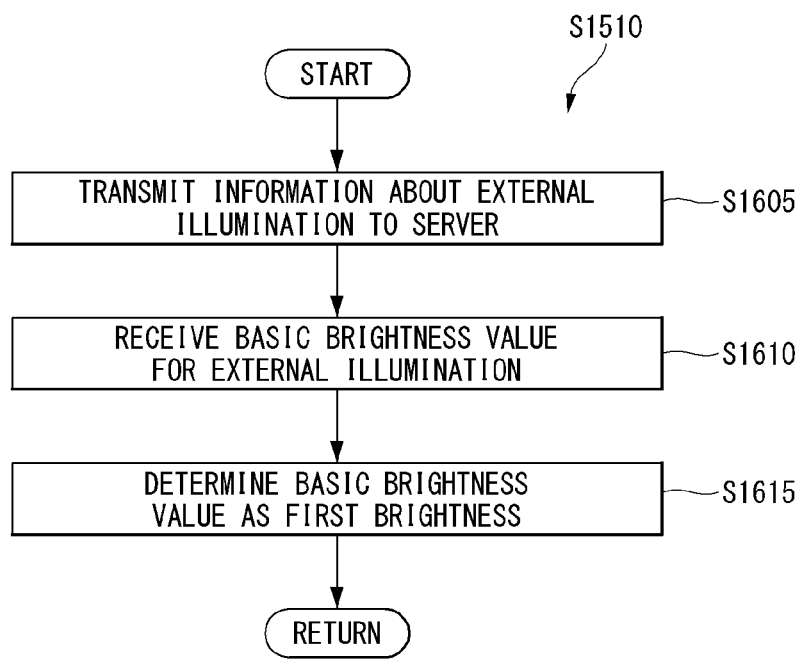
FIG. 16 is a flowchart showing an example of a process of outputting first brightness in an autonomous driving system according to an embodiment of the present disclosure.

FIG. 16 is a flowchart showing an example of a process of outputting first brightness in an autonomous driving system according to an embodiment of the present disclosure. FIG. 16 shows an example of step S1510.

According to the embodiment of the present disclosure shown in FIG. 16, the method may include outputting light corresponding to the first brightness value of FIG. 15 (S1510), transmitting information about external illumination of the vehicle 1200 to the server 1250 (S1605), receiving a basic brightness value for the external illumination of the vehicle 1200 from the server 1250 (S1610), and determining the basic brightness value received from the server 1250 as the first brightness value (S1615).

In step S1605, the headlight brightness control module 1364 can transmit information about the external illumination acquired by the illumination state monitoring module 1362 to the server 1250 through the transceiver 1370. For example, the illumination state monitoring module 1362 can monitor the current external illumination in real time. Here, the information about external illumination may include a brightness value of the outside of the vehicle 1200 with respect the image data generated by the camera 1310.

In step S1610, the headlight brightness control module 1364 can receive a basic brightness value for the external illumination from the server 125 through the transceiver 1370. For example, when the vehicle 1200 enters a specific section, the headlight brightness control module 1364 can receive an appropriate basic brightness value for the current illumination of the outside of the vehicle 1200 from the server 1250. Here, the basic brightness value may show a brightness value learned through deep learning that considers a headlight output value of another vehicle collected in a similar environment (similar external illumination). That is, the basic brightness value that is determined by the server 1250 is determined on the basis of learning information about the external illumination of the vehicle 1200 and the learning information may include headlight brightness information of another vehicle collected in an environment similar to the external illumination of the vehicle 120 (an environment having illumination within a predetermined range from the external illumination of the vehicle).

In step S1615, the headlight brightness control module 1364 can determine the basic brightness value received from the server 1250 as the first brightness value in step S1510 of FIG. 15. That is, the headlight brightness control module 1364 can control the headlights to output light having brightness corresponding to the basic brightness value received from the server 1250. Thereafter, the processor 1350 can move on to step S1515 of FIG. 15.

Figure 17:
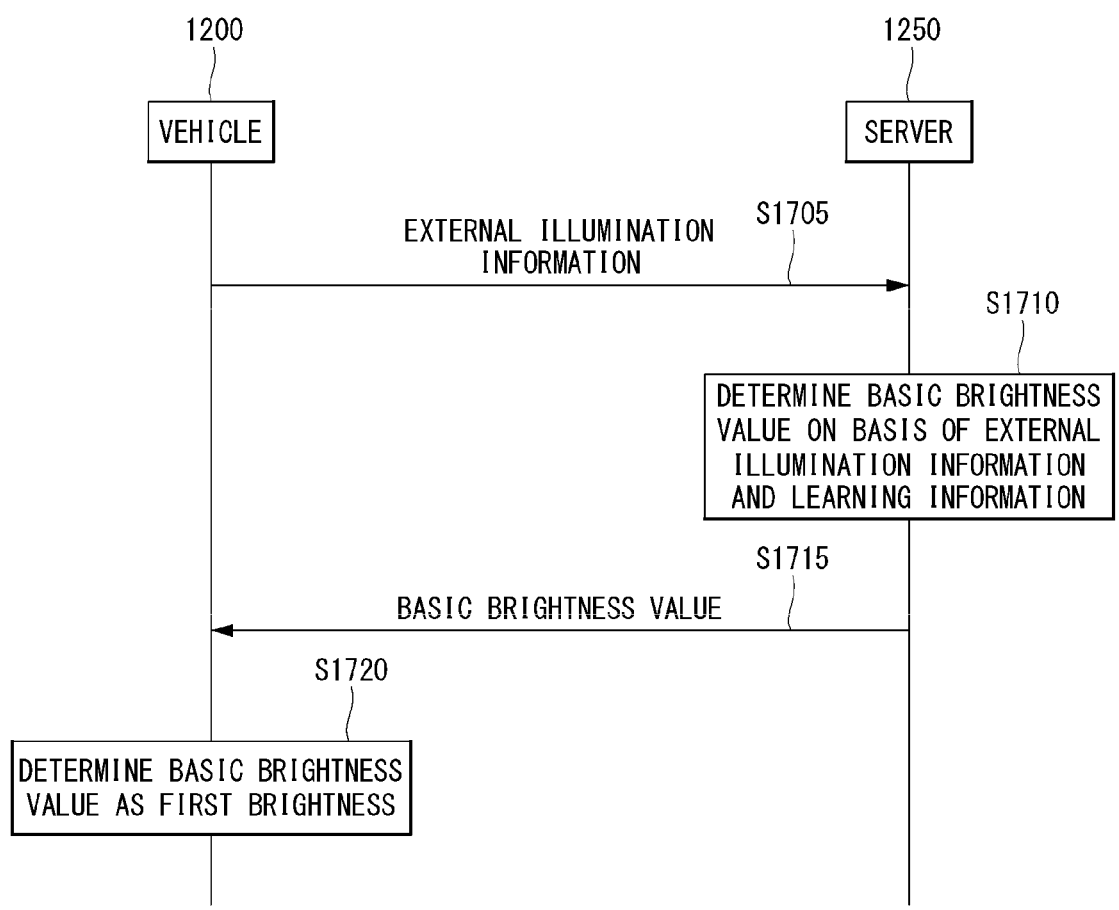
FIG. 17 shows an example of a process of transmitting and receiving a signal in the process of outputting first brightness in an autonomous driving system according to an embodiment of the present disclosure.

FIG. 17 shows an example of a process of transmitting and receiving a signal in the process of outputting first brightness in an autonomous driving system according to an embodiment of the present disclosure. FIG. 17 shows an example of step S1510.

In an embodiment of the present disclosure according to FIG. 17, an autonomous driving system may include a vehicle 1200 driving along a predetermined route and a sever 1250 capable of communicating with the vehicle 1200 and providing data for driving of the vehicle 1200. The vehicle 1200 transmits information about external illumination to the server (S1705), the server 1250 determines a basic brightness value on the basis of the received information about external illumination and learning information (S1710) and transmits the determined basic brightness value to the vehicle (S1715), and the vehicle 1200 determines the basic brightness value received from the server 1250 as a first brightness value (S1720).

In step S1705, the vehicle 1200 can transmit information about external illumination (external illumination information) of the vehicle 1200 to the server 1250. Here, the external illumination information may include an illumination value of the outside of the vehicle extracted from image data generated through the camera 1310 or an illumination value measured by the illumination sensor 1315. The external illumination information can be transmitted to the server 1250 at an initial point in time when the vehicle 1200 starts to be driven, and then can be transmitted periodically or by necessity of the vehicle 1200 or the server 1250.

In step S1710, the basic brightness value learning module 1252 of the server 1250 determines a basic brightness value on the basis of the external illumination information received in step S1705 and learning information. Here, the learning information may include headlight brightness information of another vehicle collected in an environment similar to the external illumination of the vehicle 1200.

In step S1715, the vehicle 1200 can receive the basic brightness value for the external illumination from the server 1250. For example, when the vehicle 1200 enters a specific section, the vehicle 1200 can receive an appropriate basic brightness value for the current illumination of the outside of the vehicle 1200 from the server 1250.

In step S1720, the vehicle 1200 can determine the basic brightness value received from the server 1250 as the first brightness value in step S1510 of FIG. 15. That is, the headlight brightness control module 1364 can control the headlights to output light having brightness corresponding to the basic brightness value received from the server 1250. Thereafter, the vehicle 1200 can control the headlights to output light corresponding to the first brightness.

Figure 18:
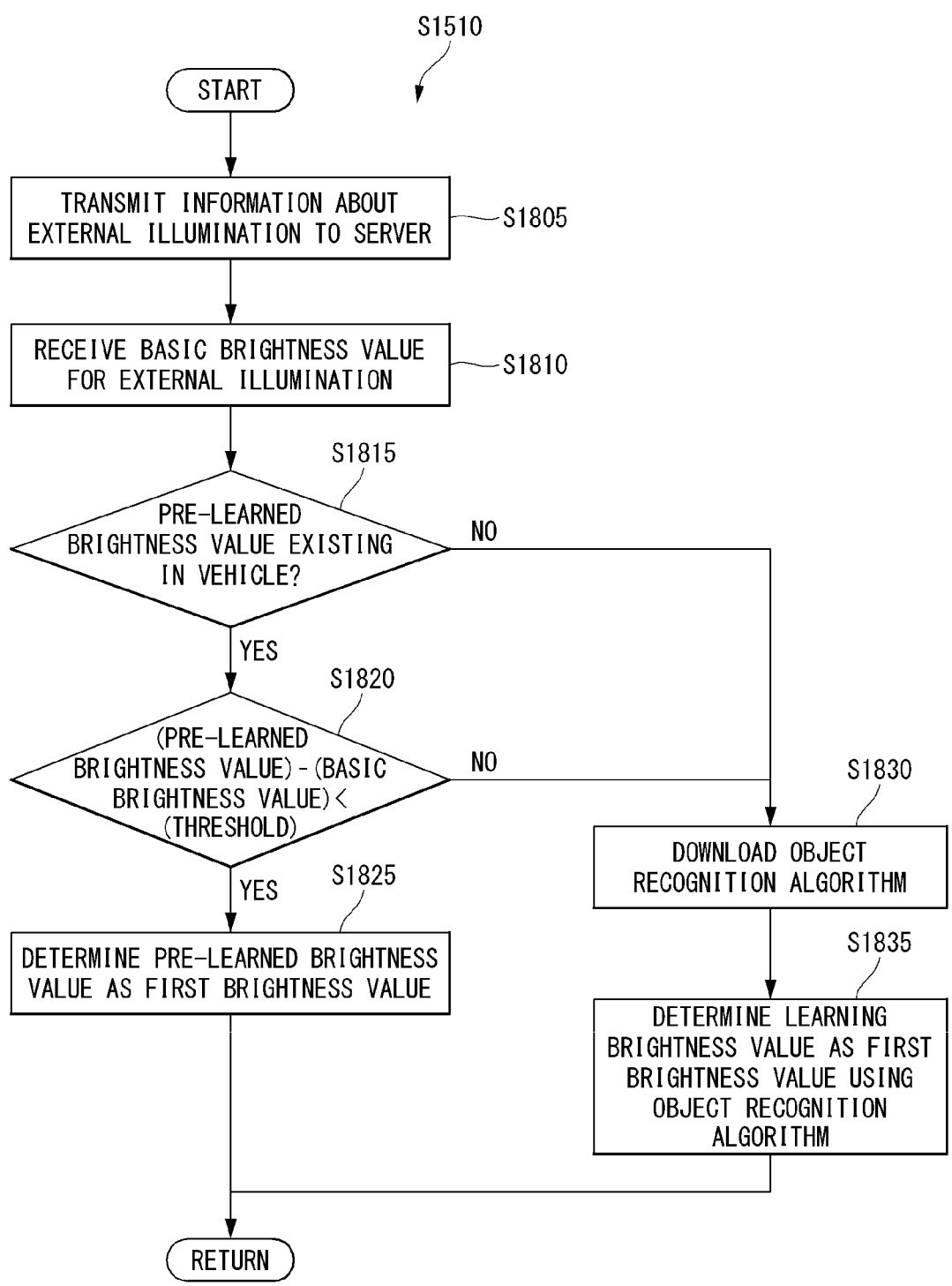
FIG. 18 is a flowchart showing another example of a process of outputting first brightness in an autonomous driving system according to an embodiment of the present disclosure.

FIG. 18 is a flowchart showing another example of a process of outputting first brightness in an autonomous driving system according to an embodiment of the present disclosure. FIG. 18 shows an example of step S1510 of FIG. 15.

According to the embodiment of the present disclosure shown in FIG. 16, the outputting of light corresponding to the first brightness value of FIG. 15 (S1510) may include: transmitting information about external illumination of the vehicle 1200 to the server 1250 (S1805); receiving a basic brightness value for the external illumination of the vehicle 1200 from the server 1250 (S1810); determining whether a pre-learned brightness value exists in the vehicle 1200 (S1815); determining a difference between a pre-learned brightness value in the vehicle 1200 and the basic brightness value received from the server 1250 when the pre-learned brightness value exists in the vehicle 1200 (S1820); determining the pre-learned brightness value in the vehicle 1200 as a first brightness value for output of the headlights 1320 when the difference between the pre-learned brightness value in the vehicle 1200 and the basic brightness value received from the server 1250 is smaller than a threshold (S1825); downloading data related to an algorithm for object recognition from the server when the difference between the pre-learned brightness value in the vehicle 1200 and the basic brightness value received from the server 1250 is larger than or equal to the threshold or when the pre-learned brightness value does not exist in the vehicle 1200 (S1830); and determining a brightness value, which is acquired by inputting the information about external illumination to the algorithm for object recognition downloaded from the server 1250, as the first brightness value for output of the headlights 1320 (S1835).

In more detail, in step S1805, the headlight brightness control module 1364 can transmit information about the external illumination acquired by the illumination state monitoring module 1362 to the server 1250 through the transceiver 1370. For example, the illumination state monitoring module 1362 can monitor the current external illumination in real time. Here, the information about external illumination may include a brightness value of the outside of the vehicle 1200 with respect the image data generated by the camera 1310.

In step S1810, the headlight brightness control module 1364 can receive a basic brightness value for the external illumination from the server 125 through the transceiver 1370. For example, when the vehicle 1200 enters a specific section, the headlight brightness control module 1364 can receive an appropriate basic brightness value for the current illumination of the outside of the vehicle 1200 from the server 1250. Here, the basic brightness value may show a brightness value learned through deep learning that considers a headlight output value of another vehicle collected in a similar environment (similar external illumination). That is, the basic brightness value that is determined by the server 1250 is determined on the basis of learning information about the external illumination of the vehicle 1200 and the learning information may include headlight brightness information of another vehicle collected in an environment similar to the external illumination of the vehicle 120 (an environment having illumination within a predetermined range from the external illumination of the vehicle).

In step S1815, the headlight brightness control module 1364 can check whether a pre-learned brightness value corresponding to the current external illumination of the vehicle 1200 exists in the data stored in the memory 1330. For example, when the external illumination of the vehicle 1200 is 3 kLx (when it is a rainy day), the headlight brightness control module 1364 can check whether a headlight brightness value learned in the environment of 3 kLx exists in the data stored in the memory 1330.

When a pre-learned brightness value corresponding to the current external illumination of the vehicle 1200 exist in step S1815, the headlight brightness control module 1364 can determine the difference between the pre-learned brightness value in the vehicle 1200 and the basic brightness value received from the server 1250. When the difference between the pre-learned brightness value in the vehicle 1200 and the basic brightness value received from the server 1250 is smaller than a threshold, the headlight brightness control module 1364 can determine the pre-learned brightness value as a first brightness value in step S1825. That is, when a pre-learned brightness value exists for the external illumination of the vehicle 1200 and the difference between the pre-learned brightness value and the basic brightness value received from the server 1250 is small (when the difference is smaller than the threshold), the headlight brightness control module 1364 can apply the pre-learned brightness value first. In another embodiment, the headlight brightness control module 1364 can determine the basic brightness value received from the server 1250 first as a first brightness value.

When a pre-learned brightness value corresponding to the current external illumination of the vehicle 1200 exists, or even if a pre-learned brightness value exists, the difference between the pre-learned brightness value in the vehicle 1200 and the basic brightness value received from the server 1250 is larger than or equal to the threshold in step S1815, the headlight brightness control module 1364, in step S1830, determines that an algorithm for object recognition has not been stored in the memory 1330 and can download an algorithm for object recognition from the server 1250.

In step S1835, the headlight brightness control module 1364 can determine a brightness value learned using the algorithm for object recognition downloaded from the server 1250 as the first brightness value. That is, the headlight brightness control module 1364 can determine a brightness value, which is acquired by inputting the information about external illumination of the vehicle 1200 to the algorithm for object recognition, as the first brightness value. In another embodiment, when the brightness value learned using the algorithm for object recognition downloaded from the server 1250 and the basic brightness value received from the server 1250 are the same, the headlight brightness control module 1364 can determine the learned brightness value as the first brightness value.

For example, when the vehicle 1200 enters a specific area, if pre-learned brightness is 40 klx, a brightness value received from the server 1250 is 10 klx for an area A and 43 klx for an area B, the brightness for the area A is acquired by updating an algorithm and 40 klx that is a pre-learned brightness value in the vehicle 1200 can be used as the brightness value for the area A.

Figure 19:
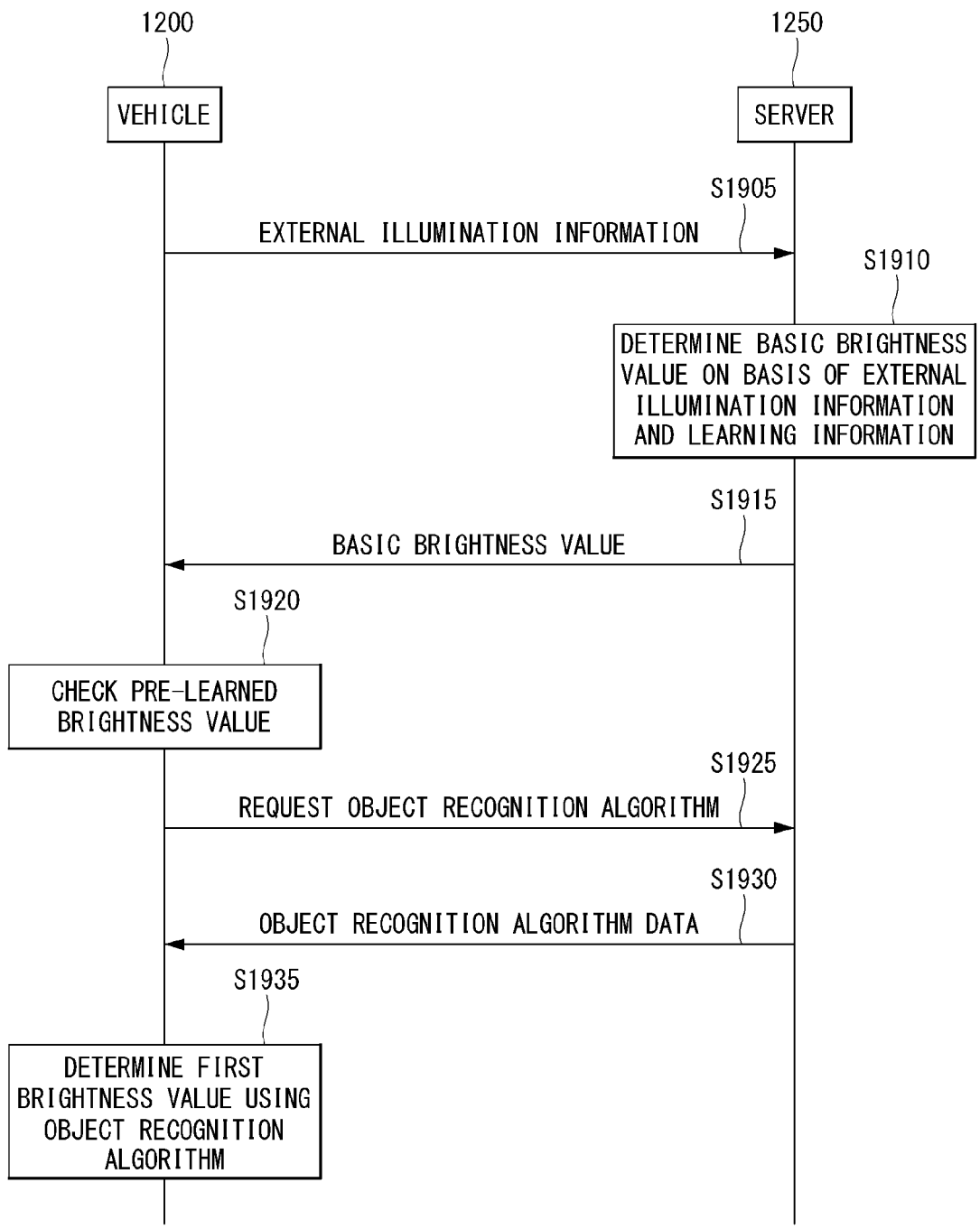
FIG. 19 shows another example of a process of transmitting and receiving a signal in the process of outputting first brightness in an autonomous driving system according to an embodiment of the present disclosure.

FIG. 19 shows another example of a process of transmitting and receiving a signal in the process of outputting first brightness in an autonomous driving system according to an embodiment of the present disclosure. FIG. 19 shows an example of step S1510.

In an embodiment of the present disclosure according to FIG. 19, an autonomous driving system may include a vehicle 1200 driving along a predetermined route and a server 1250 capable of communicating with the vehicle 1200 and providing data for driving of the vehicle. The vehicle 1200 transmits information about external illumination to the server (S1905); the server 1250 determines a basic brightness value on the basis of the received information about external illumination and learning information (S1910) and transmits the determined basic brightness value to the vehicle (S1915); the vehicle 1200 checks whether a pre-learned brightness value corresponding to the external illumination exists (S1920); and when a pre-learned brightness value does not exist or a difference from the basic brightness value received from the server 1250 is large, the vehicle 1200 transmits a message requesting an algorithm for object recognition (object recognition algorithm) to the server 1250, the server 1250 transmits data for executing the object recognition algorithm (object recognition algorithm data) in correspondence to the object recognition algorithm request from the vehicle 1200, and the vehicle 1200 can determine a brightness value (first brightness value) corresponding to the external illumination using the object recognition algorithm data.

Figure 20:
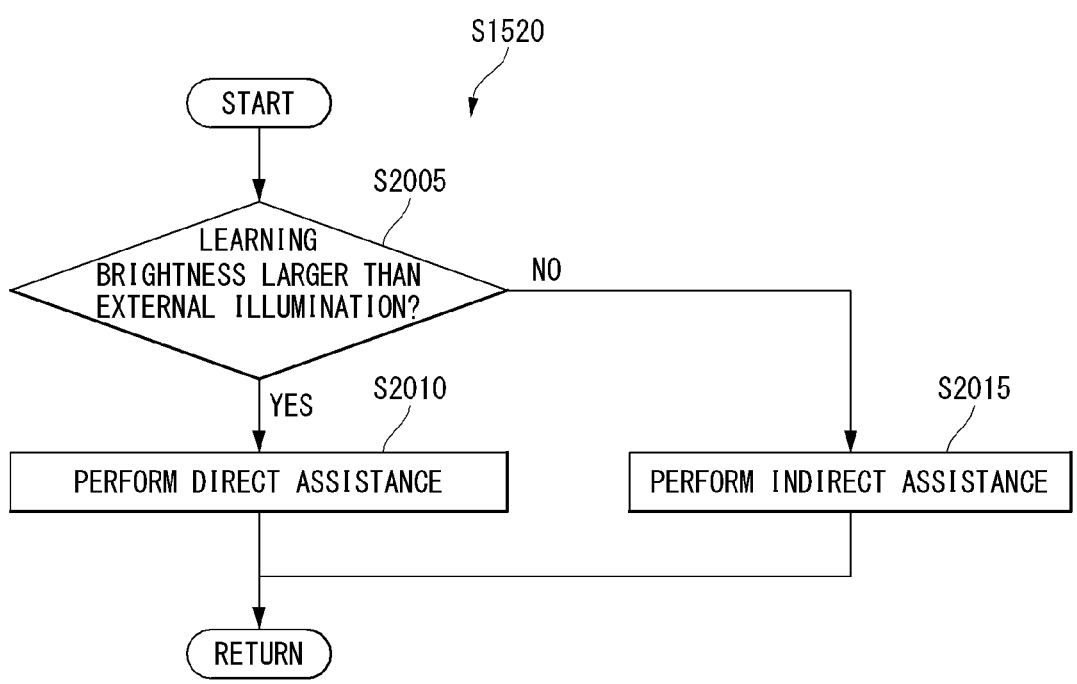
FIG. 20 is a flowchart showing an example of a process of outputting second brightness in an autonomous driving system according to an embodiment of the present disclosure.

FIG. 20 is a flowchart showing an example of a process of outputting second brightness in an autonomous driving system according to an embodiment of the present disclosure. FIG. 20 shows an example of step S1520 of FIG. 15.

In an embodiment of the present disclosure according to FIG. 20, the outputting of light corresponding to a second brightness value (S1520) may include: comparing the external illumination of the vehicle 1200 with learning brightness corresponding to the environment of the vehicle 1200 (S2005); performing direct assistance that changes the brightness of the light to second brightness when the learning brightness corresponding to the environment of the vehicle 1200 is larger than the external illumination (S2010); and performing indirect assistance that uses a surrounding vehicle or a surrounding object to recognize an object having a recognition error larger than a predetermined range when the learning brightness corresponding to the environment of the vehicle 1200 is smaller than the external illumination of the vehicle 1200 (S2015).

When an object having a recognition error larger than a predetermined range as in step S1515 of FIG. 15 while light corresponding to a first brightness value is output as in step S1510 of FIG. 15, the processor 1350 can change the brightness of light output by the headlights 1320 to recognize the object to second brightness, and a process for determining the second brightness that is the changed brightness of the light can be performed as in FIG. 20.

In more detail, in step S2005, the processor 1350 (assistance state inference module 1366) can compare external illumination extracted from video data generated by the camera 1310 with learning brightness corresponding to the current environment of the vehicle 1200 stored in the memory 1350.

As the comparing result in step S2005, when the learning brightness corresponding to the current environment of the vehicle 1200 is larger than the external illumination extracted from the video data, the processor 1350 (or the headlight brightness control module 1364), in step S2010, can perform direct assistance that changes the brightness of light output by the headlights 1320 to the second brightness. For example, when brightness (illumination) recognized from image data currently generated through the camera 1310 is lower than brightness (illumination) of a learned environment (when the present time is dark), direct assistance that changes the brightness of the light output by the headlights 1320 of the vehicle 1200 can be performed.

As the comparing result in step S2005, when the learning brightness corresponding to the current environment of the vehicle 1200 is smaller than or equal to the external illumination extracted from the video data, the processor 1350 (or the headlight brightness control module 1364) or the objective vehicle-indirect assistance request module 1368, in step S2015, can perform indirect assistance that uses a surrounding vehicle or a surrounding object to recognize an object with a large recognition error. For example, when brightness (illumination) recognized from image data currently generated through the camera 1310 is higher than brightness (illumination) of a learned environment (when the present time is dark), direct assistance that changes the direction of the light output from the headlights 1320 of the vehicle 1200 or changes the headlight setting of a surrounding vehicle 1260 can be performed.

Figure 21:
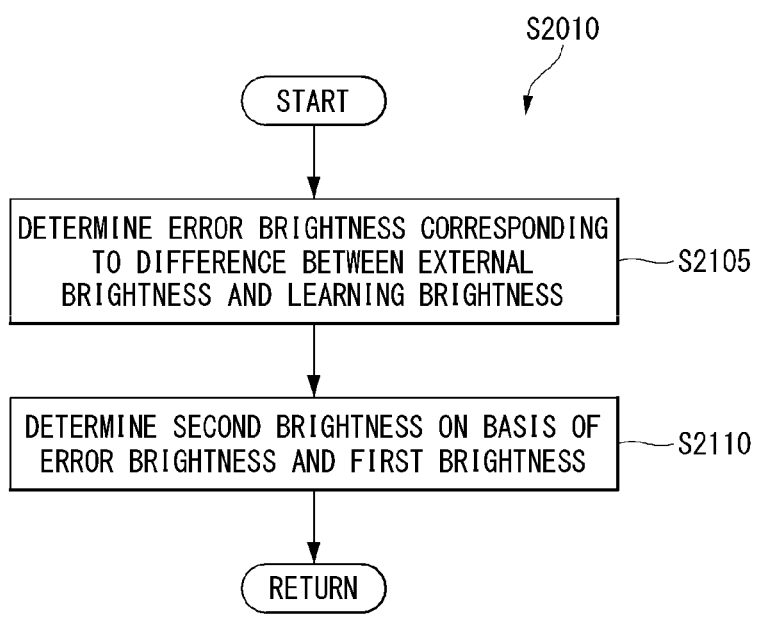
FIG. 21 is a flowchart showing an example of a process of performing direct assistance in an autonomous driving system according to an embodiment of the present disclosure.

FIG. 21 is a flowchart showing an example of a process of performing direct assistance in an autonomous driving system according to an embodiment of the present disclosure. The operations shown in FIG. 21 are examples of step S2010 of FIG. 20.

In the embodiment of the present disclosure according to FIG. 21, the performing of direct assistance of FIG. 20 may include: determining error brightness corresponding to the difference between the external illumination of the vehicle 1200 and the learning brightness corresponding to the current environment of the vehicle 1200 (S2105); and determining second brightness on the basis of the error brightness and the first brightness (S2110).

In more detail, the processor 1350 (or the headlight brightness control module 1364), in step S2105, can determine error brightness that is a value obtained by subtracting current external illumination of the vehicle 1200 inferred from image data generated through the camera 1310 from learning environment brightness stored in the memory 1330. For example, when the learning brightness corresponding to the environment of the vehicle 1200 is 42 kLx and the external illumination of the vehicle 1200 is 30 kLx, the processor 1340 can determine 12 kLx as error brightness.

Thereafter, in step S2110, the processor 1350 (or the headlight brightness control module 1364) can determine second brightness changed on the basis of the error brightness determined in step S2105 and the first brightness that is the brightness of the light currently output from the headlights 1310. For example, the processor 1350 can determine second brightness increased by 12 kLx, which is error brightness, from the first brightness of the light currently output from the headlights 1310.

Figure 22:
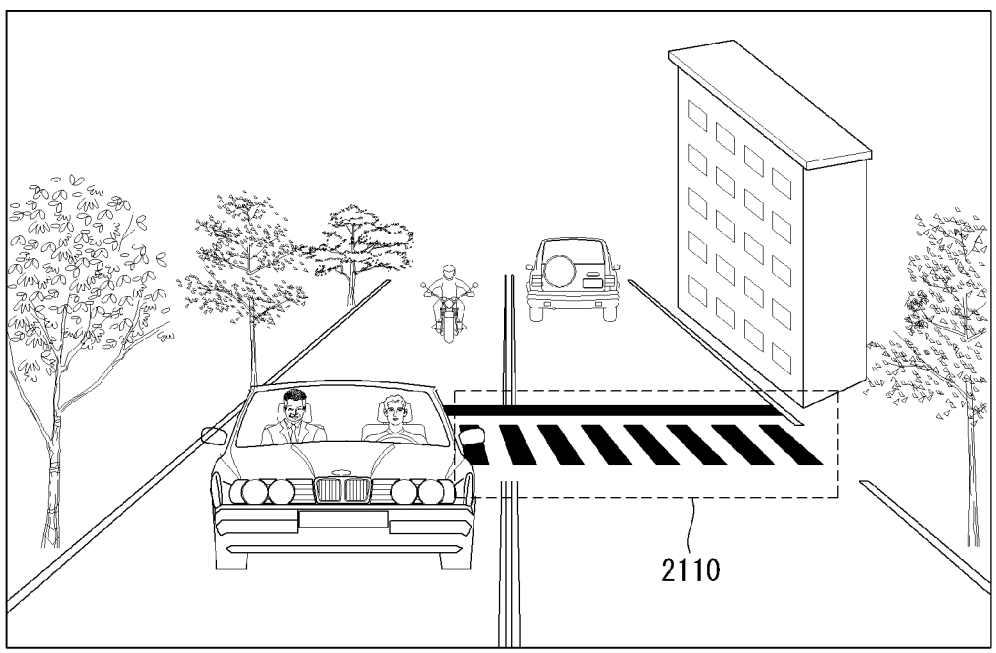
FIG. 22 shows an example of a case when an object with a large recognition error is detected in an autonomous driving system according to an embodiment of the present disclosure, and direct assistance is applied in correspondence to detection of an object with a large recognition error in an autonomous driving system according to an embodiment of the present disclosure.

FIG. 22 shows an example of a case when an object with a large recognition error is detected in an autonomous driving system according to an embodiment of the present disclosure.

Referring to FIG. 22, the processor 1350 can detect an object 2110 having a recognition error larger than a predetermined range during driving while recognizing objects from image data generated by the camera 1310. When learning brightness corresponding to the current environment of the vehicle 1200 is larger than external illumination extracted from video data, the processor 1350 can determine to perform direct assistance and can increase the brightness of light output from the headlights 1320 by error brightness that is a value obtained by subtracting the external illumination extracted from the video data from the learning brightness corresponding to the current environment.

In the example of FIG. 22, direct assistance may be applied in correspondence to detection of an object with a large recognition error in an autonomous driving system according to an embodiment of the present disclosure. Referring to FIG. 22, by increasing the brightness of light output by the headlights 1320, illumination is changed to be similar to the learned environment of the vehicle 1200, and the processor 1350 can find out that the object 2110 having a large recognition error is a crosswalk by matching the pre-learned data to the environment 2120 around the object.

Figure 23:
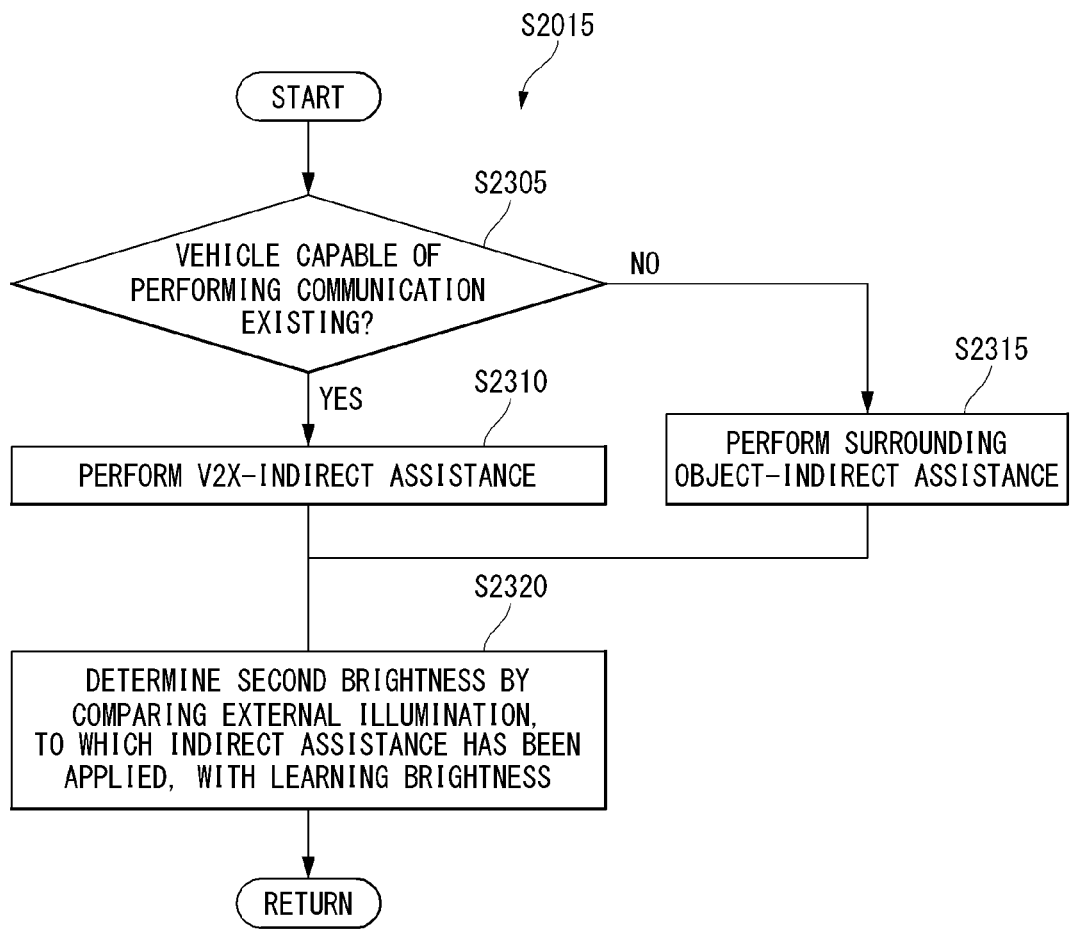
FIG. 23 is a flowchart showing an example of a process of performing indirect assistance in an autonomous driving system according to an embodiment of the present disclosure.

FIG. 23 is a flowchart showing an example of a process of performing indirect assistance in an autonomous driving system according to an embodiment of the present disclosure. FIG. 23 shows an example of step S2015 of FIG. 20.

In an embodiment of the present disclosure according to FIG. 23, the performing of indirect assistance of FIG. 20 may include: determining whether a surrounding vehicle 1260 that can communicate with the vehicle 1200 exists (S2305); performing V2X-indirect assistance that changes the headlight setting of the surrounding vehicle 1260 when the surrounding vehicle 1260 that can perform communication exists (S2310); performing surrounding object-indirect assistance that outputs light to an object having a recognition error larger than a predetermined range and another surrounding object when the surrounding vehicle 1260 that can perform communication does not exist (S2315); and determining second brightness that is changed brightness by comparing again external illumination, to which V2X-indirect assistance or surrounding object-indirect assistance has been applied, with the learning brightness corresponding to the environment of the vehicle (S2320).

For example, the processor 1350 (or the objective vehicle-indirect assistance request module 1368), in step S2305, can transmit a search signal to check whether a surrounding vehicle 1260 that can perform communication exists around the vehicle 1200 for indirect assistance, and can check whether a response signal is received from the surrounding vehicle 1260.

Figure 24:
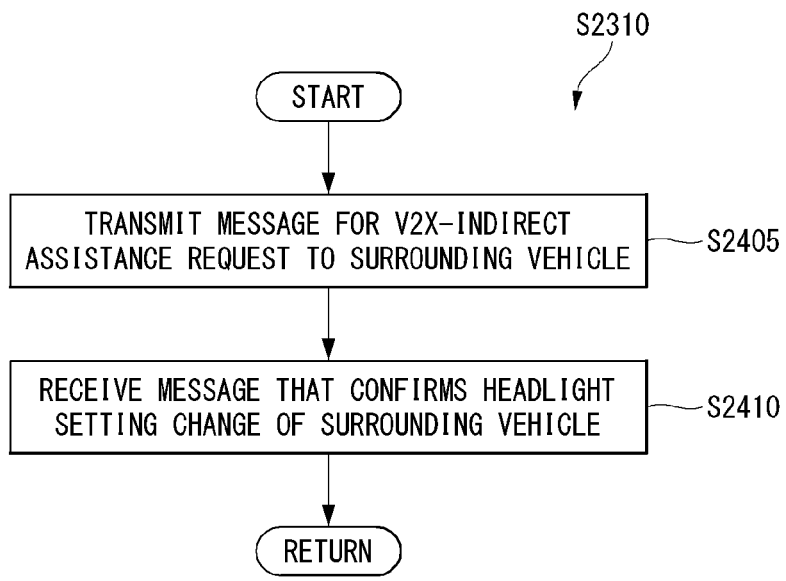
FIG. 24 is a flowchart showing an example of a process of performing V2X-indirect assistance in an autonomous driving system according to an embodiment of the present disclosure.
Figure 25:
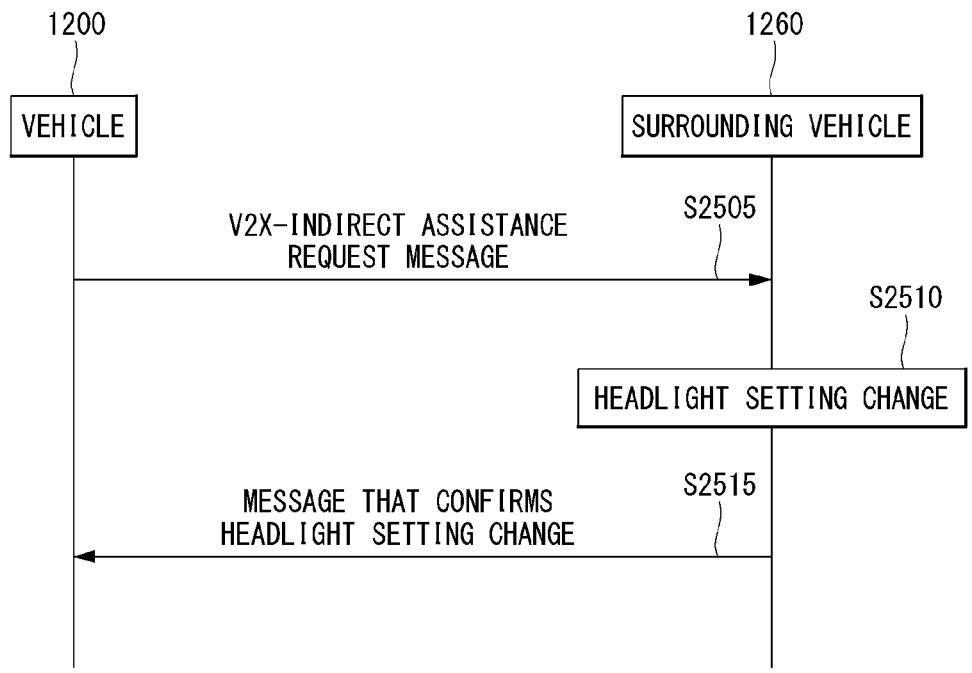
FIG. 25 shows an example of a process of transmitting and receiving a signal in the process of performing V2X-indirect assistance in an autonomous driving system according to an embodiment of the present disclosure.
Figure 26:
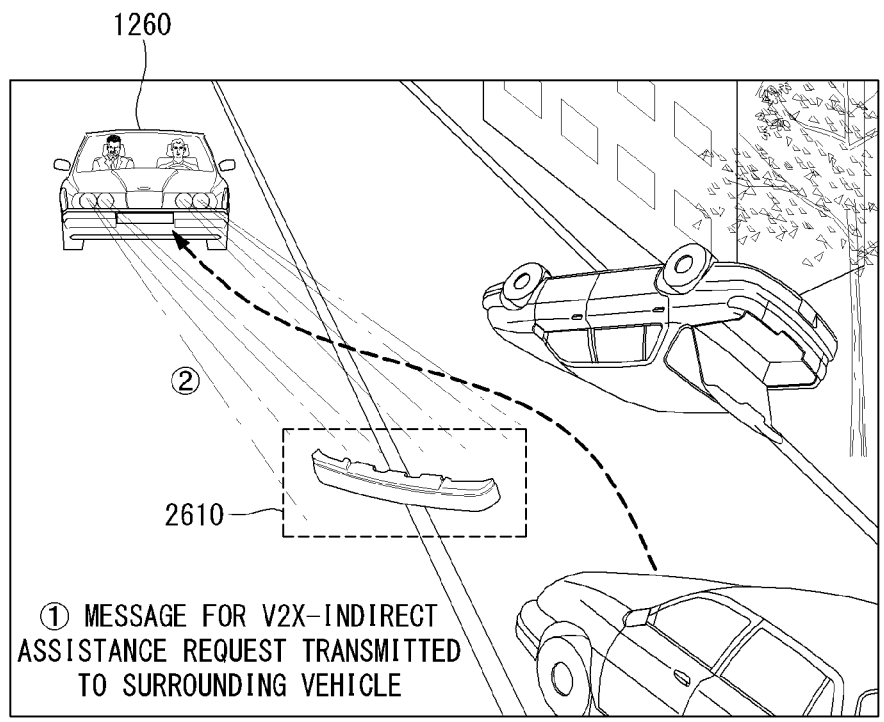
FIG. 26 shows an example of a case when V2X-indirect assistance is performed in an autonomous driving system according to an embodiment of the present disclosure.

When a surrounding vehicle 1260 that can perform communication exists, the processor (or the objective vehicle-indirect assistance request module 1368), in step S2310, can perform V2X-indirect assistance such as the following description referring to FIGS. 24 to 26.

When a surrounding vehicle 1260 that can perform communication does not exist, the processor 1350 (or the headlight brightness control module 1364) can perform surrounding object-indirect assistance such as the following description referring to FIG. 27.

Thereafter, in step S2320, the processor 1350 (or the headlight brightness control module 1364) can move on to step S2005 of FIG. 20 to compare again external illumination to which V2X-indirect assistance or surrounding object-indirect assistance has been applied with the learning brightness corresponding to the environment of the vehicle.

FIG. 24 is a flowchart showing an example of a process of performing V2X-indirect assistance in an autonomous driving system according to an embodiment of the present disclosure. FIG. 24 shows an example of step S2310 of FIG. 23.

In the embodiment of the present disclosure shown in FIG. 24, the performing of V2X-indirect assistance of step S2310 may include transmitting a message for a V2X-indirect assistance request to the surrounding vehicle 1260 that can communicate with the vehicle 1200 (S2405), and receiving a message that confirms a setting change of the headlights of the surrounding vehicle 1260 from the surrounding vehicle 1260 (S2410). Here, the message for a V2X-indirect assistance request may include at least one of headlight setting information of the vehicle 1200 and the position of an object having a recognition error larger than a predetermined range.

For example, when an object 2610 having lower recognition accuracy and positioned forward is detected, as in FIG. 26, the processor 1350 (or the objective vehicle-indirect assistance request module 1368) of the vehicle 1200 transmits a message for a V2X-indirect assistance request, which requests the surrounding vehicle 1260 to radiate light to the object, through the transceiver 1370. Here, the message for V2X-indirect assistance request that the vehicle 1200 transmits to the surrounding vehicle 1260 may include the headlight setting value (first brightness) of the vehicle 1200 and the position of the object 1260. The surrounding vehicle 1260 receiving the message for V2X-indirect assistance request can change the setting of the headlights, and for example, the surrounding vehicle 1260 can radiate light to the object 2610 indicated by the vehicle 1200.

Thereafter, the processor 1350 receives the message that confirms the headlight setting change from the surrounding vehicle 1260 through the transceiver 1370 and can infer again an error state by moving on to step S2320 of FIG. 23. That is, backlight is generated in the camera 1310 of the vehicle 1200 by the light output through the headlights of the surrounding vehicle 1260, so the external illumination that is acquired through the camera 1310 is changed and the external illumination that is acquired through the camera 1310 relatively decreases, and accordingly, it can be changed into a state requiring direct assistance.

FIG. 25 shows an example of a process of transmitting and receiving a signal in the process of performing V2X-indirect assistance in an autonomous driving system according to an embodiment of the present disclosure. FIG. 25 shows an example of communication that is performed between the vehicle 1200 and the surrounding vehicle 1260 in step S2310 of FIG. 23.

In an embodiment of the present disclosure according to FIG. 25, au autonomous driving system may include a vehicle 1200 that is driven along a predetermined route, and a surrounding vehicle 1260 that can communicate with the vehicle 1200 and assist driving of the vehicle 1200 while communicating with the vehicle 1200. The vehicle 1200 transmits a message for a V2X-indirect assistance request to the surrounding vehicle 1260 (S2505) and the surrounding vehicle 1260 changes a setting of headlights in correspondence to the message for a V2X-indirect assistance request (S2510) and transmits a message that confirms a setting change of the headlights to the vehicle 1200 (S2515). Thereafter, the vehicle 1200 can infer again a difference between external illumination and learning environment brightness.

FIG. 26 shows an example of a case when V2X-indirect assistance is performed in an autonomous driving system according to an embodiment of the present disclosure.

Referring to FIG. 26, the vehicle 1200 detects an object 2610 having a recognition error larger than a predetermined range during driving while outputting light corresponding to a first brightness value. When a surrounding vehicle 2610 that can communicate with the vehicle 1200 exists, the vehicle 1200 transmits a message for a V2X-indirect assistance request to the surrounding vehicle 2610, and the surrounding vehicle 1260 changes a headlight setting of the surrounding vehicle 1260 when receiving the message for a V2X-indirect assistance request. In FIG. 26, the surrounding vehicle 1260 checks the message received from the vehicle 1200, radiates light to the object 2610, and transmits a message that confirms the headlight setting change to the vehicle 1200. The vehicle 1200 confirming the headlight setting change from the surrounding vehicle 1260 can recognize again the object 2610 by comparing the external illumination changed by backlight generated by the light of the surrounding vehicle 1260 with the learning environment brightness.

FIG. 27 is a flowchart showing an example of a process of performing surrounding object-indirect assistance in an autonomous driving system according to an embodiment of the present disclosure. FIG. 27 shows an example of step S2315 of FIG. 23.

In an embodiment of the present disclosure according to FIG. 27, the performing of surrounding object-indirect assistance (S2315) may include determining an indirect assistance object for surrounding object-indirect assistance on the basis of a position and movement of each of objects around an object having a recognition error larger than a predetermined range (S2705), and outputting light to the indirect assistance object (S2710).

In more detail, in step S2705, the processor 1305 (or the object recognition module 1362) can determine an indirect assistance object for surrounding object-indirect assistance of other objects around an object with a large recognition error from image data generated by the camera 1310.

For example, when an object 2610 with a large recognition error is detected and a surrounding vehicle 1260 that can perform communication does not exist around in FIG. 26, an object having smallest movement of objects around the object 2610 (objects within a predetermined distance from the object 2610) can be determined as an indirect assistance object.

Thereafter, in step S2710, the processor 1305 (or the headlight brightness control module 1364) can control the headlights 1320 to radiate light to the indirect assistance object determined in step S2705. Here, the brightness of the light that is radiated to the indirect assistance object may have brightness higher than the first brightness that has been output before. By radiating light with higher brightness to the indirect assistance object, the external illumination of the vehicle 1200 is changed by backlight in the image data generated through the camera 1310 and a brightness error can be calculated again through comparison of the changed external illumination and the learning environment brightness.

For example, when indirect assistance is required due to a low degree of object recognition of a 'person on a bicycle' at 100 m forward from a vehicle 1200 at 12 p.m., the vehicle 1200 can radiate light to a fence that is an object with a smallest movement degree of other objects searched for indirect assistance. Thereafter, object recognition can be performed again with backlight generated.

FIG. 28 is a flowchart showing another example of a method for controlling a vehicle in an autonomous driving system according to an embodiment of the present disclosure.

Steps S2805 to S2820 in FIG. 28 are substantially the same as steps S1505 to S2520 of FIG. 15, and updating object recognition learning data (S2825) is further included in the method according to the embodiment of FIG. 15. Since steps S2805 to S2820 are substantially the same as steps S1505 to S2520 of FIG. 15, additional description about steps S2805 to S2820 is omitted to avoid repeated description.

Additionally, the embodiment of the present disclosure according to FIG. 28 further includes updating object recognition learning data (S2825) The processor 1350 (or the object recognition module 1355) of the vehicle control apparatus 1300 can update object recognition learning data through communication with the server 1250 when a recognition error of an object decreases, by outputting light corresponding to the second brightness value in step S2820. The process of updating object recognition learning data is described in more detail with reference to FIGS. 29 to 31.

Figure 29:
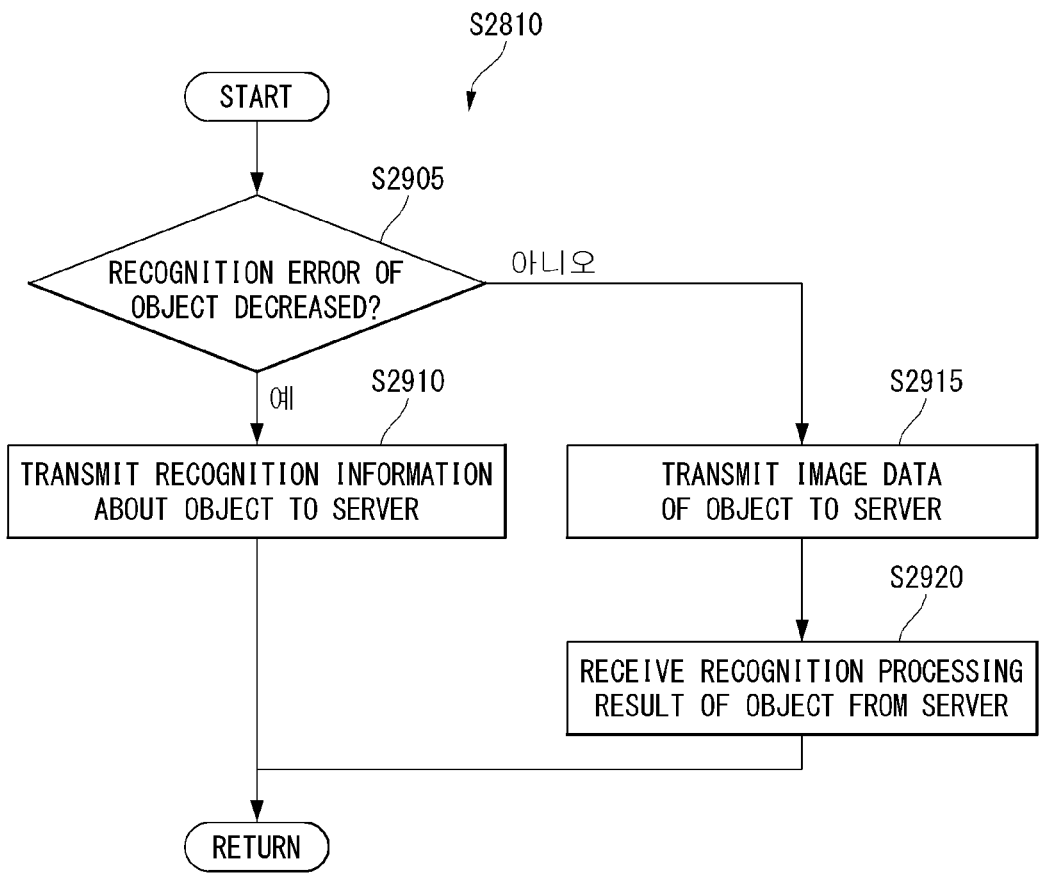
FIG. 29 is a flowchart showing an example of a process of updating learning data of an object in an autonomous driving system according to an embodiment of the present disclosure.

FIG. 29 is a flowchart showing an example of a process of updating learning data of an object in an autonomous driving system according to an embodiment of the present disclosure. FIG. 29 shows an example of step S2825 of FIG. 28.

In an embodiment of the present disclosure according to FIG. 29, the updating of learning data of FIG. 28 includes checking whether a recognition error of the object decreases by outputting light corresponding to the second brightness (S2905), transmitting recognition information about the object to the server 1250 (S2910), transmitting image data including the object to the server 1250 when the recognition error does not decrease (S2915), and receiving recognition processing result information about the object from the server 1250 (S2920). In step S2910, the recognition information about the object may include at least one of information about the reduced recognition error of the object or information about the second brightness output by the vehicle 1200.

In more detail, in step S2905, the processor 1350 (or the object recognition module 1355) of the vehicle control apparatus 1300 can check whether the recognition error of the object, which had had a large recognition error, has decreased, by changing the brightness of the light output through the headlight 1320 to the second brightness value.

When the recognition error of the object has decreased within a predetermined range, the processor 1350 (or the object recognition module 1355), in step S2910, can transmit recognition information about the object to the server 1250 through the transceiver 1370. Here, the recognition information of the object may include information (kind, shape, movement) about the object, recognition accuracy (recognition accuracy before/after changing, and recognition error), a brightness setting value (first brightness value and second brightness value) of the headlights 1320.

For example, if an object had had recognition accuracy of 50% (the range of set recognition accuracy is 70%) when external illumination before a brightness setting was changed was 30 kLx, by changing the external illumination to 40 kLx after the brightness setting is changed, the recognition accuracy of the object can be improved to 80%. In this case, the vehicle 1200 can transmit information about the external illumination before/after changing and the recognition accuracy of the object together with the information about the object to the server 1250.

When the recognition error of the object is still larger than a predetermined range, the processor 1350 (or the object recognition module 1355), in step S2915, can transmit image data including the object to the server 1250 through the transceiver 1370. Thereafter, in step S2920, the processor 1350 (or the object recognition module 1355) can receive recognition processing result information about the object from the server 1250 through the transceiver 1370.

For example, when there is no surrounding vehicle 1260 that can perform communication and no surrounding object for indirect assistance around the vehicle 1200, the vehicle 1200 can transmit image data generated through the camera 1310 to recognize an object using a resource of the server 1250 and can receive an object recognition processing result performed by the server 1250. Thereafter, the vehicle 1200 can perform object recognition in a similar environment, using the object recognition processing result received from the server 1250.

Figure 30:
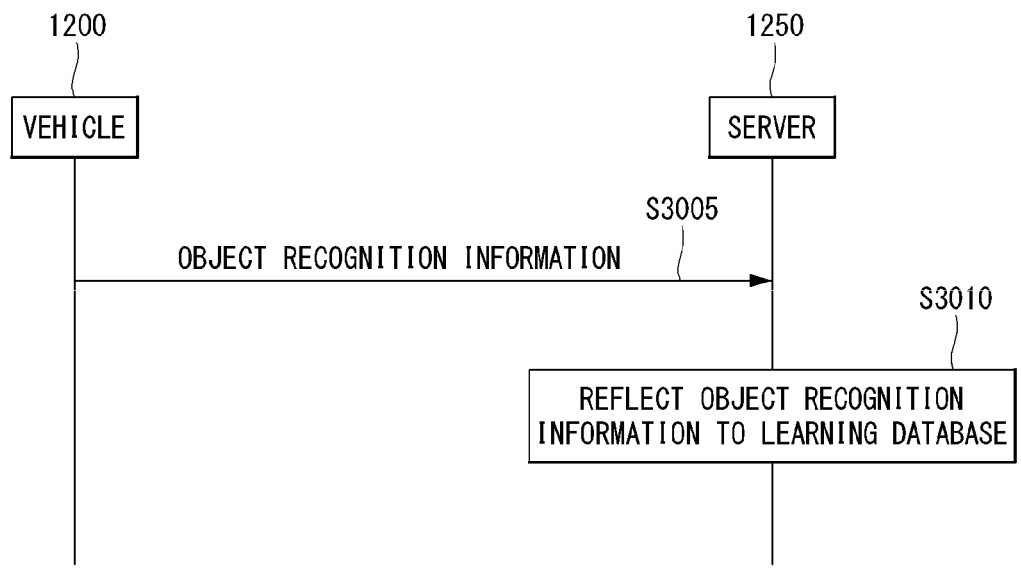
FIG. 30 shows an example of a process of transmitting and receiving a signal in the process of updating learning data of an object in an autonomous driving system according to an embodiment of the present disclosure.

FIG. 30 shows an example of a process of transmitting and receiving a signal in the process of updating learning data of an object in an autonomous driving system according to an embodiment of the present disclosure. FIG. 30 shows an example of communication that is performed between the vehicle 1200 and the server 1250 in step S2910 of FIG. 29.

In an embodiment of the present disclosure according to FIG. 30, an autonomous driving system may include a vehicle 1200 that is driven through a predetermined route and a server 1250 that can communicate with the vehicle 1200 and provides data for driving of the vehicle 1200. The vehicle 1200 transmits object recognition information acquired by changing a light output value to a second brightness value to the server 1250 (S3005) and the server 1250 can reflect the object recognition information received from the vehicle 1200 to a learning database for object recognition (S3010). The server 1250 can provide information for recognizing an object in a similar environment to another vehicle using the updated learning database.

Figure 31:
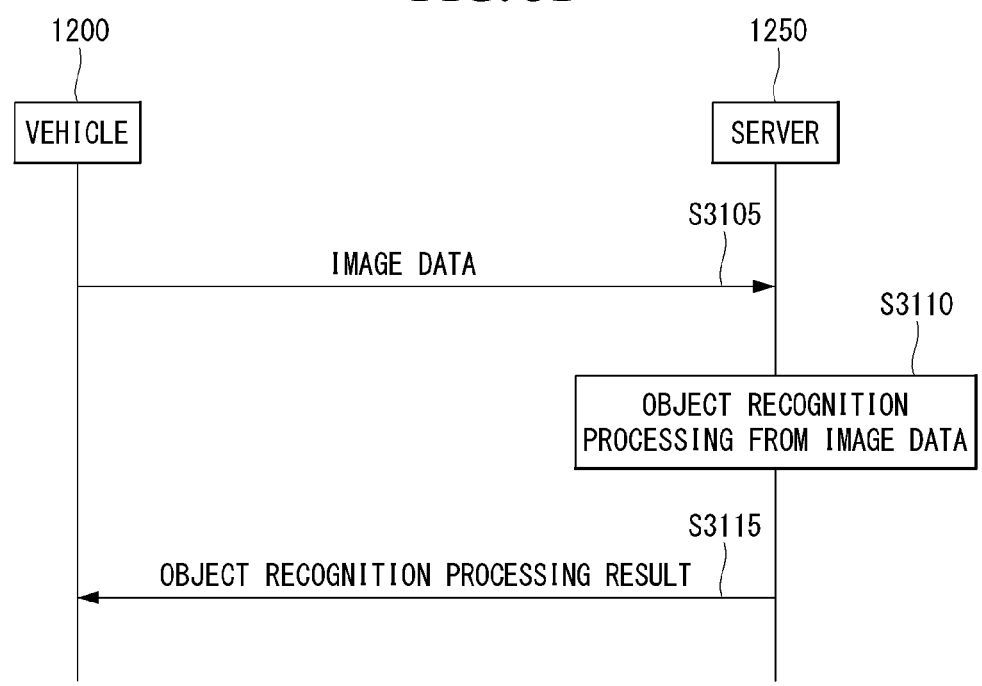
FIG. 31 shows another example of a process of transmitting and receiving a signal in the process of updating learning data of an object in an autonomous driving system according to an embodiment of the present disclosure.

FIG. 31 shows another example of a process of transmitting and receiving a signal in the process of updating learning data of an object in an autonomous driving system according to an embodiment of the present disclosure. FIG. 31 shows an example of communication that is performed between the vehicle 1200 and the server 1250 in steps S2915 and S2920 of FIG. 29.

In an embodiment of the present disclosure according to FIG. 31, an autonomous driving system may include a vehicle 1200 that is driven through a predetermined route and a server 1250 that can communicate with the vehicle 1200 and provides data for driving of the vehicle 1200. The vehicle 1200 transmits image data including an object with a large recognition error to the server 1250 (S3105), the server 1250 performs object recognition processing from the image data received from the vehicle 1200 (S3110), and the server 1250 can transmit an object recognition processing result to the vehicle 1200. The vehicle 1200 can recognize the object using recognition information about the object acquired through a resource of the server 1250.

Figure 32:
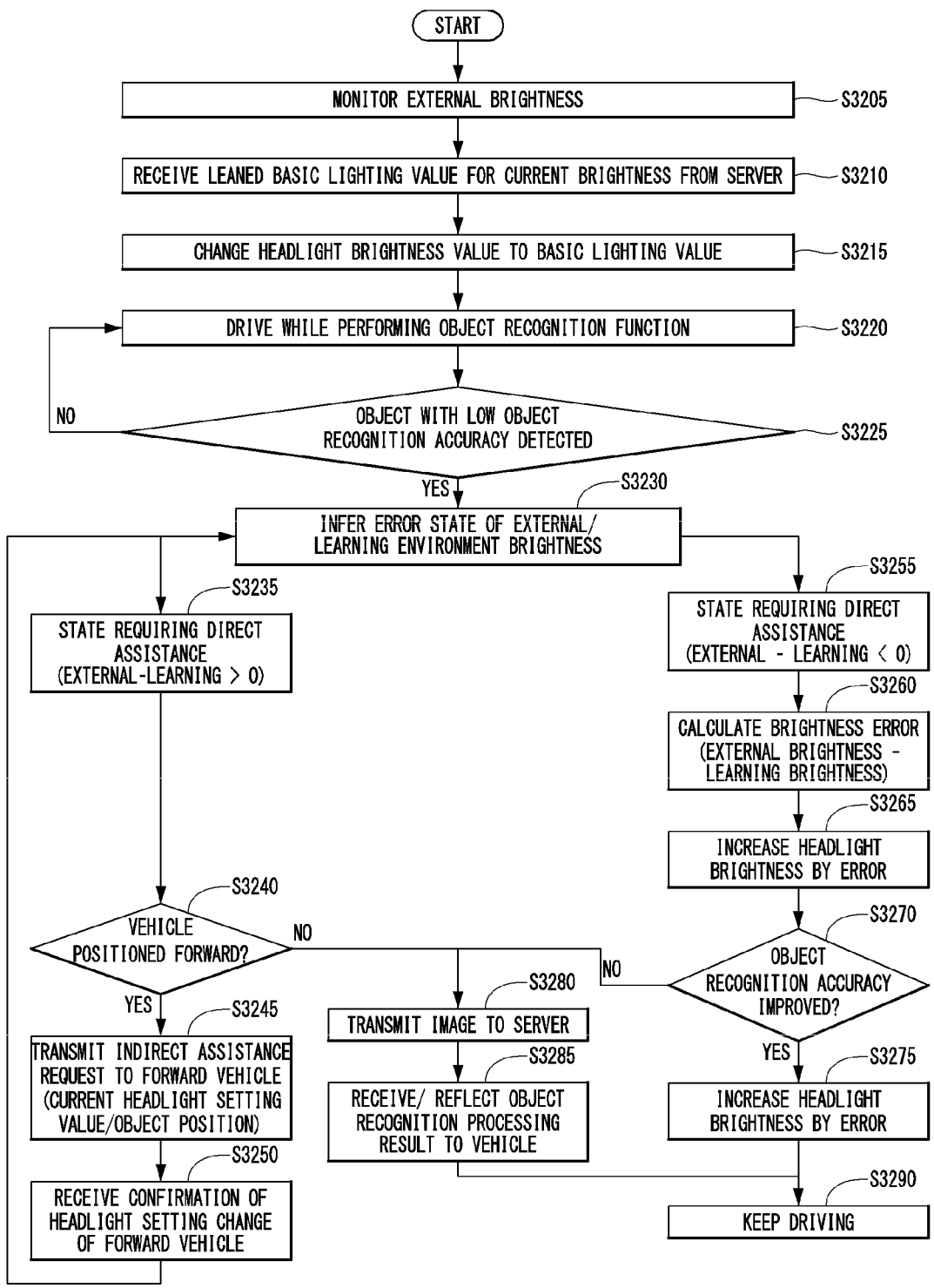
FIG. 32 is a block diagram illustrating an example of a method for controlling a vehicle in an autonomous driving system according to an embodiment of the present disclosure.

FIG. 32 is a block diagram illustrating an example of a method for controlling a vehicle in an autonomous driving system according to an embodiment of the present disclosure.

Referring to FIG. 32, the vehicle control apparatus 1300 monitors external illumination from the point in timing when driving is started. When external illumination is acquired, the vehicle control apparatus 1300 receives a basic brightness value leaned for the current external illumination from the server 1250 (S3210). When receiving the basic brightness value, the vehicle control apparatus 1300 changes the brightness value of the headlight 1320 to a first brightness value from the basic brightness value received from the server 1250 (S3215). Thereafter, the vehicle control apparatus 1300 controls a driving unit of the vehicle 1200 to drive while outputting light with the brightness to which the changed brightness value has been applied (S3220). The vehicle control apparatus 1300 checks whether an object with low object recognition accuracy is detected during driving, and keeps driving when an object with low object recognition accuracy is not detected (S3225).

When an object with low object recognition accuracy is detected, the vehicle control apparatus 1300 infers an error state between external illumination and learning environment brightness (S3230). When the external illumination is higher than the learning environment brightness, the vehicle control apparatus 1300 determines that it is a state requiring indirect assistance and checks whether a surrounding vehicle 1260 that can perform communication exists (S3240). When a surrounding vehicle 1260 that can perform communication exists, the vehicle control apparatus 1300 transmits a message for an indirect assistance request to the surrounding vehicle 1260 (S3245) and receives a message that confirms a headlight setting change of the surrounding vehicle 1260 from the surrounding vehicle 1260 (S3250). Further, the vehicle control apparatus 1300 returns to step S3230 and infers again the error state between the external illumination and the learning environment brightness.

When external illumination is lower than the learning environment brightness, the vehicle control apparatus 1300 determines that it is a state requiring direct assistance (S3255), calculates a brightness error that is obtained by subtracting the learning environment brightness from the external illumination (S3260), and increases the brightness of the headlights to second brightness by the calculated brightness error (S3265). After increasing the brightness of the headlight, the vehicle control apparatus 1300 checks whether the recognition accuracy of the object has been improved (S3270). When the object recognition accuracy has been improved, the vehicle control apparatus 1300 transmits object recognition information including object information, object recognition accuracy, and a brightness setting value to the server 1250 (S3275), and keeps driving (S3290). When the object recognition accuracy has not been improved, the vehicle control apparatus 1300 transmits image data to the server 1250 (S3280), receives an object recognition processing result from the server 1250 and reflects the object recognition processing result to learning data of the vehicle (S3285), and keeps driving (S3290).

Embodiment 1

A method for controlling a vehicle in an autonomous driving system includes: acquiring an information about external illumination outside a vehicle; outputting light corresponding to a first brightness value that is determined on the basis of information about external illumination; checking an object having a recognition error larger than a predetermined range while outputting the light corresponding to the first brightness value; and outputting light corresponding to a second brightness value that is determined on the basis of a recognition error of the object.

Embodiment 2

In the embodiment 1, the outputting of light corresponding to a first brightness value may include: transmitting information about the external illumination to a server; receiving a basic brightness value for the external illumination from the server; and determining the basic brightness value as the first brightness value, wherein the basic brightness value is determined on the basis of the information about the external illumination and learning information and the learning information may include headlight brightness information of another vehicle collected in an environment similar to the external illumination.

Embodiment 3

In the embodiment 1, the outputting of light corresponding to a first brightness may include: transmitting information about the external illumination to a server; receiving a basic brightness value for the external illumination from the server; determining whether a pre-learned brightness value exists in the vehicle; determining a difference between the pre-learned brightness value and the basic brightness value when the pre-learned brightness value exists in the vehicle; determining the pre-learned brightness value as the first brightness value when the difference between the pre-learned brightness value and the basic brightness value is smaller than a threshold; and downloading data related to an algorithm for object recognition from the server when the difference between the pre-learned brightness value and the basic brightness value is larger than or equal to the threshold or when a pre-learned brightness value does not exist in the vehicle and determining a brightness value, which is acquired by inputting the information about external illumination to the algorithm for object recognition, as the first brightness value.

Embodiment 4

In the embodiment 1, the outputting of light corresponding to a second brightness value may include: comparing the external illumination with learning brightness corresponding to an environment of the vehicle; performing direct assistance, which changes brightness of the light to the second brightness, when the learning brightness corresponding to the environment of the vehicle is higher than the external illumination; and performing indirect assistance that uses a surrounding vehicle or a surrounding object to recognize the object when the learning brightness corresponding to the environment of the vehicle is lower than the external illumination.

Embodiment 5

In the embodiment 4, the performing of direct assistance may include: determining error brightness corresponding to the difference between the external illumination and the learning brightness corresponding to the current environment of the vehicle; and determining the second brightness on the basis of the error brightness and the first brightness.

Embodiment 6

In the embodiment 4, the performing of indirect assistance may include: determining whether a surrounding vehicle that can communicate with the vehicle exists; performing V2X-indirect assistance that changes a headlight setting of the surrounding vehicle when the surrounding vehicle that can perform communication exists; performing surrounding object-indirect assistance that outputs light to the object and another surrounding object when the surrounding vehicle that can perform communication does not exist; and determining the second brightness by comparing again the external illumination, to which the V2X-indirect assistance or the surrounding object-indirect assistance has been applied, with the learning brightness corresponding to the environment of the vehicle.

Embodiment 7

In the embodiment 6, the performing of V2X-indirect assistance may include: transmitting a message for a V2X-indirect assistance request the surrounding vehicle that can communicate with the vehicle; and receiving a message that confirms a setting change of headlights of the surrounding vehicle from the surrounding vehicle.

Embodiment 8

In the embodiment 7, the message for a V2X-indirect assistance request may include at least one of headlight setting information of the vehicle and a position of the object.

Embodiment 9

In the embodiment 6, the performing of surrounding object-indirect assistance may include: determining an indirect assistance object for the surrounding object-indirect assistance on the basis of a position and movement of each of objects around the object having a recognition error larger than the predetermined range; and outputting light to the indirect assistance object.

Embodiment 10

The embodiment 1, further includes updating learning data for the object having a recognition error larger than the predetermined range, wherein the updating of learning data may include: checking whether the recognition error of the object decreases by outputting light corresponding to the second brightness; transmitting recognition information about the object to a server when the recognition error decreases (the recognition information about the object including at least one of information about the object, information about the decreased recognition error of the object, or information about second brightness output by the vehicle); and transmitting image data including the object to the server and receiving recognition processing result information about the object from the server when the recognition error has not decreased.

Embodiment 11

An apparatus for controlling a vehicle in an autonomous driving system includes: a processor that controls functions of the vehicle; a camera that is combined with the processor and generates image data of a surrounding of the vehicle; a memory that is combined with the memory and stores data for controlling the vehicle; and a transceiver that is combined with the processor and transmits or receives the data for controlling the vehicle, wherein the processor is configured to acquire information about external illumination of the vehicle through the camera, control headlights to output light corresponding to a first brightness value that is determined on the basis of the external illumination, check an object having a recognition error larger than a predetermined range while outputting light corresponding to the first brightness value, and control the headlights to output light corresponding to a second brightness value on the basis of a recognition error of the object.

Embodiment 12

In the embodiment 11, the processor is configured to transmit information about the external illumination to a server through the transceiver, receive a basic brightness value for the external illumination from the server through the transceiver, and determine the basic brightness value as the first brightness value, wherein the basic brightness value is determined on the basis of the information about the external illumination and learning information and the learning information may include headlight brightness information of another vehicle collected in an environment similar to the external illumination.

Embodiment 13

In the embodiment 11, the processor may be configured to transmit information about the external illumination to a server through the transceiver, receive a basic brightness value for the external illumination from the server through the transceiver, determine whether a pre-learned brightness value stored in the memory exist, determine a difference between the pre-learned brightness value and the basic brightness value when the pre-learned brightness value is stored in the memory, determine the pre-learned brightness value as the first brightness value when the difference between the pre-learned brightness value and the basic brightness value is smaller than a threshold, and download data related to an algorithm for object recognition from the server and determine a brightness value, which is acquired by inputting the information about external illumination to the algorithm for object recognition, as the first brightness value, when the difference between the pre-learned brightness value and the basic brightness value is larger than or equal to the threshold or when a pre-learned brightness value does not exist in the vehicle.

Embodiment 14

In the embodiment 11, the processor may be configured to compare the external illumination with learning brightness corresponding to an environment of the vehicle, perform direct assistance, which changes brightness of the light to the second brightness, when the learning brightness corresponding to the environment of the vehicle is higher than the external illumination; and perform indirect assistance that uses a surrounding vehicle or a surrounding object to recognize the object when the learning brightness corresponding to the environment of the vehicle is lower than the external illumination.

Embodiment 15

In the embodiment 14, the processor may be configured to determine error brightness corresponding to the difference between the external illumination and the learning brightness corresponding to the current environment of the vehicle, and determine the second brightness on the basis of the error brightness and the first brightness.

Embodiment 16

In the embodiment 14, the processor may be configured to determine whether a surrounding vehicle that can communicate with the vehicle exists, perform V2X-indirect assistance that changes a headlight setting of the surrounding vehicle when the surrounding vehicle that can perform communication exists, perform surrounding object-indirect assistance that outputs light to the object and another surrounding object when the surrounding vehicle that can perform communication does not exist, and determine the second brightness by comparing again the external illumination, to which the V2X-indirect assistance or the surrounding object-indirect assistance has been applied, with the learning brightness corresponding to the environment of the vehicle.

Embodiment 17

In the embodiment 16, the processor may be configured to transmit a message for a V2X-indirect assistance request the surrounding vehicle that can communicate with the vehicle through the transceiver, and receive a message that confirms a setting change of headlights of the surrounding vehicle from the surrounding vehicle through the transceiver.

Embodiment 18

In the embodiment 17, the message for a V2X-indirect assistance request may include at least one of headlight setting information of the vehicle and a position of the object.

Embodiment 19

In the embodiment 16, the processor may be configured to determine an indirect assistance object for the surrounding object-indirect assistance on the basis of a position and movement of each of objects around the object having a recognition error larger than the predetermined range, and control the headlight to output light to the indirect assistance object.

Embodiment 20

In the embodiment 11, the processor may be configured to check whether the recognition error of the object decreases by outputting light corresponding to the second brightness, transmit recognition information about the object to a server when the recognition error decreases through the transceiver, in which the recognition information about the object includes at least one of information about the object, information about the decreased recognition error of the object, or information about second brightness output by the vehicle, and transmit image data including the object to the server and receive recognition processing result information about the object from the server when the recognition error has not decreased.

The present disclosure can be achieved by computer-readable codes on a program-recoded medium. A computer-readable medium includes all kinds of recording devices that keep data that can be read by a computer system. For example, the computer-readable medium may be an HDD (Hard Disk Drive), an SSD (Solid State Disk), an SDD (Silicon Disk Drive), a ROM, a RAM, a CD-ROM, a magnetic tape, a floppy disk, and an optical data storage, and may also be implemented in a carrier wave type (for example, transmission using the internet). Accordingly, the detailed description should not be construed as being limited in all respects and should be construed as an example. The scope of the present disclosure should be determined by reasonable analysis of the claims and all changes within an equivalent range of the present disclosure is included in the scope of the present disclosure.

Effects of a method and apparatus for controlling a vehicle in an autonomous driving system according to an embodiment of the present disclosure are as follows.

The present disclosure can implement a method and apparatus for controlling a vehicle to accurately recognize an object in an autonomous driving system by adjusting a setting of headlights in accordance with recognition accuracy of the object.

The effects of the present disclosure are not limited to the effects described above and other effects can be clearly understood by those skilled in the art from the following description.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a vehicle in an autonomous driving system, the method comprising:
    acquiring an information regarding external illumination outside a vehicle;
    outputting light corresponding to a first brightness value that is determined on the basis of the information regarding external illumination;
    checking an object having a recognition error greater than a predetermined range while outputting the light corresponding to the first brightness value; and
    outputting light corresponding to a second brightness value that is determined on the basis of a recognition error of the object,
    wherein outputting light corresponding to the first brightness value includes:
        transmitting, to a server, information regarding the external illumination;
        receiving, from the server, a basic brightness value for the external illumination;
        determining whether a pre-learned brightness value exists in the vehicle;
        determining, based on the pre-learned brightness value existing in the vehicle, a difference between the pre-learned brightness value and the basic brightness value;
        based on the difference between the pre-learned brightness value and the basic brightness value being less than a threshold, determining the pre-learned brightness value as the first brightness value; and
        based on the difference between the pre-learned brightness value and the basic brightness value being greater than or equal to the threshold or a pre-learned brightness value not existing in the vehicle, downloading data related to an algorithm for object recognition from the server and determining the first brightness value by inputting the information regarding the external illumination to the algorithm for object recognition.

2. The method of claim 1, wherein outputting light corresponding to a second brightness value includes:
    comparing the external illumination with learning brightness corresponding to an environment of the vehicle;
    performing direct assistance, which changes brightness of the light to the second brightness, based on the learning brightness corresponding to the environment of the vehicle being higher than the external illumination; and
    performing indirect assistance that uses a surrounding vehicle or a surrounding object to recognize the object based on the learning brightness corresponding to the environment of the vehicle being lower than the external illumination.

3. The method of claim 2, wherein performing direct assistance includes:
    determining error brightness corresponding to a difference between the external illumination and the learning brightness corresponding to the environment of the vehicle; and
    determining the second brightness on the basis of the error brightness and the first brightness.

4. The method of claim 2, wherein performing indirect assistance includes:
    determining whether a surrounding vehicle that can communicate with the vehicle exists;
    performing V2X-indirect assistance that changes a headlight setting of the surrounding vehicle based on the surrounding vehicle that can perform communication existing;
    performing surrounding object-indirect assistance that outputs light to the object and another surrounding object based on the surrounding vehicle that can perform communication not existing; and
    determining the second brightness by comparing again the external illumination, to which the V2X-indirect assistance or the surrounding object-indirect assistance has been applied, with the learning brightness corresponding to the environment of the vehicle.

5. The method of claim 4, wherein the performing of V2X-indirect assistance includes:
transmitting a message for a V2X-indirect assistance request the surrounding vehicle that can communicate with the vehicle; and
receiving a message that confirms a setting change of headlights of the surrounding vehicle from the surrounding vehicle.

6. The method of claim 5, wherein the message for a V2X-indirect assistance request includes at least one of headlight setting information of the vehicle or a position of the object.

7. The method of claim 4, wherein the performing of surrounding object-indirect assistance includes:
determining an indirect assistance object for the surrounding object-indirect assistance on the basis of a position and movement of each of objects around the object having a recognition error larger than the predetermined range; and
outputting light to the indirect assistance object.

8. The method of claim 1, further comprising updating learning data for the object having a recognition error larger than the predetermined range,
wherein updating learning data includes:
checking whether the recognition error of the object decreases by outputting light corresponding to the second brightness;
transmitting recognition information regarding the object to a server based on the recognition error decreasing, the recognition information regarding the object including at least one of information about the object, information regarding the decreased recognition error of the object, or information about second brightness output by the vehicle; and
transmitting image data including the object to the server and receiving recognition processing result information regarding the object from the server based on the recognition error not being decreased.

9. The method of claim 1, wherein the information regarding external illumination includes an outside brightness value of the outside of the vehicle with respect to image data generated by a camera implemented in the vehicle.

10. The method of claim 1, wherein the basic brightness value is determined based on learning information regarding the external illumination, and
wherein the learning information includes headlight brightness information of another vehicle.

11. An apparatus for controlling a vehicle in an autonomous driving system, the apparatus comprising:
a processor that controls functions of the vehicle;
a camera that is combined with the processor and that is configured to generate image data of a surrounding of the vehicle;
a memory that is combined with the processor and that stores data for controlling the vehicle; and
a transceiver that is combined with the processor and that is configured to transmit or receive the data for controlling the vehicle,
wherein the processor is configured to:
acquire information regarding external illumination of the vehicle through the camera,
control headlights to output light corresponding to a first brightness value that is determined on the basis of the external illumination,
check an object having a recognition error larger than a predetermined range while outputting light corresponding to the first brightness value, and
control the headlights to output light corresponding to a second brightness value on the basis of a recognition error of the object,
transmit, to a server, information regarding the external illumination through the transceiver,
receive, from the server, a basic brightness value for the external illumination through the transceiver,
determine whether a pre-learned brightness value stored in the memory exists,
determine, based on the pre-learned brightness value being stored in the memory, a difference between the pre-learned brightness value and the basic brightness value,
based on the difference between the pre-learned brightness value and the basic brightness value being less than a threshold, determine the pre-learned brightness value as the first brightness value,
download data related to an algorithm for object recognition from the server, and
based on the difference between the pre-learned brightness value and the basic brightness value being greater than or equal to the threshold or based on a pre-learned brightness value not existing in the vehicle, determine a brightness value, which is acquired by inputting the information regarding external illumination to the algorithm for object recognition, as the first brightness value.

12. The apparatus of claim 11, wherein the processor is configured to:
compare the external illumination with learning brightness corresponding to an environment of the vehicle,
perform direct assistance, which changes brightness of the light to the second brightness, based on the learning brightness corresponding to the environment of the vehicle being higher than the external illumination; and
perform indirect assistance that uses a surrounding vehicle or a surrounding object to recognize the object based on the learning brightness corresponding to the environment of the vehicle being lower than the external illumination.

13. The apparatus of claim 12, wherein the processor is configured to:
determine error brightness corresponding to a difference between the external illumination and the learning brightness corresponding to the environment of the vehicle, and
determine the second brightness on the basis of the error brightness and the first brightness.

14. The apparatus of claim 12, wherein the processor is configured to:
determine whether a surrounding vehicle that can communicate with the vehicle exists,
perform V2X-indirect assistance that changes a headlight setting of the surrounding vehicle based on the surrounding vehicle that can perform communication existing,
perform surrounding object-indirect assistance that outputs light to the object and another surrounding object based on the surrounding vehicle that can perform communication not existing, and determine the second brightness by comparing again the external illumination, to which the V2X-indirect assistance or the surrounding object-indirect assistance has been applied, with the learning brightness corresponding to the environment of the vehicle.

15. The apparatus of claim 14, wherein the processor is configured to:
transmit a message for a V2X-indirect assistance request the surrounding vehicle that can communicate with the vehicle through the transceiver, and
receive a message that confirms a setting change of headlights of the surrounding vehicle from the surrounding vehicle through the transceiver.

16. The apparatus of claim 15, wherein the message for a V2X-indirect assistance request includes at least one of headlight setting information of the vehicle or a position of the object.

17. The apparatus of claim 14, wherein the processor is configured to:
determine an indirect assistance object for the surrounding object-indirect assistance on the basis of a position and movement of each of objects around the object having a recognition error larger than the predetermined range, and
control the headlight to output light to the indirect assistance object.

18. The apparatus of claim 11, wherein the processor is configured to:
check whether the recognition error of the object decreases by outputting light corresponding to the second brightness,
transmit recognition information about the object to a server based on the recognition error decreasing through the transceiver, in which the recognition information regarding the object includes at least one of information about the object, information regarding the decreased recognition error of the object, or information regarding second brightness output by the vehicle, and
transmit image data including the object to the server and receive recognition processing result information about the object from the server based on the recognition error not being decreased.

19. The apparatus of claim 11, wherein the information regarding external illumination includes an outside brightness value of the outside of the vehicle with respect to image data generated by the camera.

20. The apparatus of claim 11, wherein the basic brightness value is determined based on learning information regarding the external illumination, and
wherein the learning information includes headlight brightness information of another vehicle.

* * * * *